US012744008B2

(12) United States Patent
Kim et al.

(10) Patent No.: US 12,744,008 B2
(45) Date of Patent: Sep. 22, 2026

(54) DISPLAY APPARATUS AND ELECTRONIC APPARATUS INCLUDING THE SAME

(71) Applicant: Samsung Display Co., Ltd., Yongin-si (KR)

(72) Inventors: Minjoo Kim, Yongin-si (KR); Jeonghun Bang, Yongin-si (KR); Jaewon Cho, Yongin-si (KR); Nackhyeon Keum, Yongin-si (KR); Sukyo Jung, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 19/265,651

(22) Filed: Jul. 10, 2025

(65) Prior Publication Data

US 2026/0024500 A1 Jan. 22, 2026

(30) Foreign Application Priority Data

Jul. 16, 2024 (KR) ........................ 10-2024-0094001
Aug. 14, 2024 (KR) ........................ 10-2024-0108965

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01);
(Continued)

(58) Field of Classification Search
CPC ... G09G 2300/0426; G09G 2300/0842; G09G 2300/0819; G09G 2300/0861; G09G 2300/0408; G09G 2300/0852; G09G 2300/0809; G09G 3/3233; G09G 3/3677; G09G 3/0648; G09G 3/20; G09G 3/3266; G09G 3/3614; G09G 3/3688; G09G 3/32; G09G 3/3225; G09G 3/3208; G09G 3/296;
(Continued)

(56) References Cited

U.S. PATENT DOCUMENTS

2016/0180817 A1 6/2016 Cho et al.
2016/0187917 A1* 6/2016 Lou ...................... G09G 3/3677 345/213

(Continued)

FOREIGN PATENT DOCUMENTS

KR 10-2017-0081043 7/2017
KR 10-2018-0061524 6/2018

(Continued)

*Primary Examiner* — Dong Hui Liang
(74) *Attorney, Agent, or Firm* — Harness, Dickey & Pierce, P.L.C.

(57) ABSTRACT

Provided is a display apparatus including a first driving circuit including odd-numbered first stages among first stages that output a first gate signal to pixels and even-numbered second stages among second stages that output a second gate signal to the f pixels, and a second driving circuit including odd-numbered second stages among the second stages and even-numbered first stages among the first stages. In the first driving circuit, the odd-numbered first stages and the even-numbered second stages are arranged alternately. In the second driving circuit, the odd-numbered second stages and the even-numbered first stages are arranged alternately.

20 Claims, 24 Drawing Sheets

(52) U.S. Cl.
CPC ............... *G09G 2300/0852* (2013.01); *G09G 2300/0861* (2013.01); *G09G 2310/0286* (2013.01); *G09G 2310/08* (2013.01); *G09G 2330/021* (2013.01)

(58) Field of Classification Search
CPC ............... G09G 3/3275; G09G 3/3291; G09G 2310/08; G09G 2310/0286; G09G 2310/0267; G09G 2310/0251; G09G 2310/0297; G09G 2310/0262; G09G 2330/021; G09G 2320/0233; G09G 2320/0247; G09G 2320/043
See application file for complete search history.

(56) References Cited

U.S. PATENT DOCUMENTS

| | | | | |
|---|---|---|---|---|
| 2018/0151125 | A1 | 5/2018 | Lee | |
| 2024/0221564 | A1* | 7/2024 | Tian | G09G 3/20 |
| 2025/0104651 | A1* | 3/2025 | Byun | G09G 3/3233 |
| 2025/0218412 | A1* | 7/2025 | Chen | G09G 3/3677 |
| 2025/0364067 | A1* | 11/2025 | Chen | G09G 3/20 |

FOREIGN PATENT DOCUMENTS

| | | |
|---|---|---|
| KR | 10-1924427 | 2/2019 |
| KR | 10-2290915 | 8/2021 |

* cited by examiner

DISPLAY APPARATUS AND ELECTRONIC APPARATUS INCLUDING THE SAME

CROSS-REFERENCE TO RELATED APPLICATION(S)

This application claims priority to and benefits of Korean Patent Application No. 10-2024-0094001 under 35 U.S.C. § 119, filed on Jul. 16, 2024, and Korean Patent Application No. 10-2024-0108965 under 35 U.S.C. § 119, filed on Aug. 14, 2024, in the Korean Intellectual Property Office, the entire contents of which are incorporated herein by reference.

BACKGROUND

1. Technical Field

One or more embodiments relate to a driving circuit a display apparatus including the driver circuit, and an electronic apparatus including the driver circuit.

2. Description of the Related Art

Display apparatuses may include pixels, a gate driver circuit, a data driver circuit, a controller, etc. The gate driver circuit may include stages connected to gate lines, and the stages supply gate signals to gate lines connected to the stages, in response to signals from the controller.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments include a driver circuit capable of stably outputting a gate signal while expanding a display area, and a display apparatus including the driver circuit. Additional aspects will be set forth in portion in the description which follows and, in part, will be apparent from the description, or may be learned by practice of the presented embodiments.

Additional aspects will be set forth in the description which follows and, in part, will be apparent from the description, or may be learned by practice of the presented embodiments of the disclosure.

According to one or more embodiments, a display apparatus may include a plurality of pixels arranged in a display area, a first driving circuit arranged in a peripheral area outside of the display area, and a second driving circuit facing the first driving circuit and arranged in the peripheral area. The first driving circuit may include odd-numbered first stages among a plurality of first stages that output a first gate signal to the plurality of pixels and even-numbered second stages among a plurality of second stages that output a second gate signal to the plurality of pixels. The second driving circuit may include odd-numbered second stages among the plurality of second stages and even-numbered first stages among the plurality of first stages. The odd-numbered first stages and the even-numbered second stages may be arranged alternately, and the odd-numbered second stages and the even-numbered first stages may be arranged alternately.

The display apparatus may further include a first start signal line electrically connected to an input terminal of a first stage arranged at a first position among the odd-numbered first stages and to an input terminal of a first stage arranged at a first position among the even-numbered first stages, and a second start signal line electrically connected to an input terminal of a second stage arranged at a first position among the odd-numbered second stages and to an input terminal of a second stage arranged at a first position among the even-numbered second stages.

A first gate signal output by a previous odd-numbered first stage may be input to an input terminal of each of first stages arranged at second and subsequent positions among the odd-numbered first stages, and a first gate signal output by a previous even-numbered first stage may be input to an input terminal of each of first stages arranged at second and subsequent positions among the even-numbered first stages.

A second gate signal output by a previous odd-numbered second stage may be input to an input terminal of each of second stages arranged at second and subsequent positions among the odd-numbered second stages, and a second gate signal output by a previous even-numbered second stage may be input to an input terminal of each of second stages arranged at second and subsequent positions among the even-numbered second stages.

The display apparatus may further include a clock line electrically connected to the first driving circuit and the second driving circuit. The clock line may include a first clock line into which a first clock signal is input, a second clock line into which a second clock signal is input, a third clock line into which a third clock signal is input, and a fourth clock line into which a fourth clock signal is input. The first clock signal, the second clock signal, the third clock signal, and the fourth clock signal may be signals of the same waveform that are phase shifted.

The first clock line and the third clock line may be alternately connected to the odd-numbered first stages of the first driving circuit, and the second clock line and the fourth clock line may be alternately connected to the even-numbered first stages of the second driving circuit.

The fourth clock line and the second clock line may be alternately connected to the odd-numbered second stages of the second driving circuit, and the first clock line and the third clock line may be alternately connected to the even-numbered second stages of the first driving circuit.

The odd-numbered first stages and the even-numbered first stages may alternately sequentially output the first gate signal, and the odd-numbered second stages and the even-numbered second stages may alternately sequentially output the second gate signal.

The display apparatus may further include a controller that independently controls an output timing of the first start signal input to the first start signal line and an output timing of the second start signal input to the second start signal line.

The controller may control a timing at which and a width with which the first gate signal is output with a first voltage level, based on a combination of outputs of the first start signal and the first clock signal, the second clock signal, the third clock signal and the fourth clock signal.

The controller may control a timing at which and a width with which the second gate signal is output with a first voltage level, based on a combination of outputs of the second start signal and the first clock signal, the second clock signal, the third clock signal and the fourth clock signal.

According to one or more embodiments, an electronic apparatus may include a controller that outputs a plurality of start signals and a plurality of clock signals, a power supply circuit that outputs a voltage, and a driving circuit that outputs a gate signal, based on a plurality of start signals, the plurality of clock signals, and the voltage. The driving circuit may include a first driving circuit and a second driving circuit facing the first driving circuit. The first driving circuit may include odd-numbered first stages among a plurality of first stages that output a first gate signal to a plurality of pixels and even-numbered second stages among a plurality of second stages that output a second gate signal to the plurality of pixels. The second driving circuit may include odd-numbered second stages among the plurality of second stages and even-numbered first stages among the plurality of first stages. The odd-numbered first stages and the even-numbered second stages may be arranged alternately, and the odd-numbered second stages and the even-numbered first stages may be arranged alternately.

A first start signal line via which a first start signal is input may be electrically connected to an input terminal of a first stage arranged at a first position among the odd-numbered first stages and an input terminal of a first stage arranged at a first position among the even-numbered first stages, and a second start signal line via which a second start signal is input may be electrically connected to an input terminal of a second stage arranged at a first position among the odd-numbered second stages and an input terminal of a second stage arranged at a first position among the even-numbered second stages.

A first gate signal output by a previous odd-numbered first stage may be input to an input terminal of each of first stages arranged at second and subsequent positions among the odd-numbered first stages, and a first gate signal output by a previous even-numbered first stage may be input to an input terminal of each of first stages arranged at second and subsequent positions among the even-numbered first stages.

A second gate signal output by a previous odd-numbered second stage may be input to an input terminal of each of second stages arranged at second and subsequent positions among the odd-numbered second stages, and a second gate signal output by a previous even-numbered second stage may be input to an input terminal of each of second stages arranged at second and subsequent positions among the even-numbered second stages.

The plurality of clock signals may include a first clock signal, a second clock signal, a third clock signal, and a fourth clock signal, and the first clock signal, the second clock signal, the third clock signal, and the fourth clock signal may be signals of the same waveform that are phase shifted.

The first clock signal and the third clock signal may be alternately input to the odd-numbered first stages of the first driving circuit, and the second clock signal and the fourth clock signal may be alternately input to the even-numbered first stages of the second driving circuit.

The fourth clock signal and the second clock signal may be alternately input to the odd-numbered second stages of the second driving circuit, and the first clock signal and the third clock signal may be alternately input to the even-numbered second stages of the first driving circuit.

The odd-numbered first stages and the even-numbered first stages may alternately sequentially output the first gate signal, and the odd-numbered second stages and the even-numbered second stages may alternately sequentially output the second gate signal.

The controller may independently control an output timing of the first start signal and an output timing of the second start signal, control a timing at which and a width with which the first gate signal is output with a first voltage level, based on a combination of outputs of the first start signal and the first clock signal, the second clock signal, the third clock signal and the fourth clock signal, and control a timing at which and a width with which the first gate signal is output with a first voltage level, based on a combination of outputs of the second start signal and the first clock signal, the second clock signal, the third clock signal and the fourth clock signal.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION OF THE EMBODIMENTS

Figure 1A:
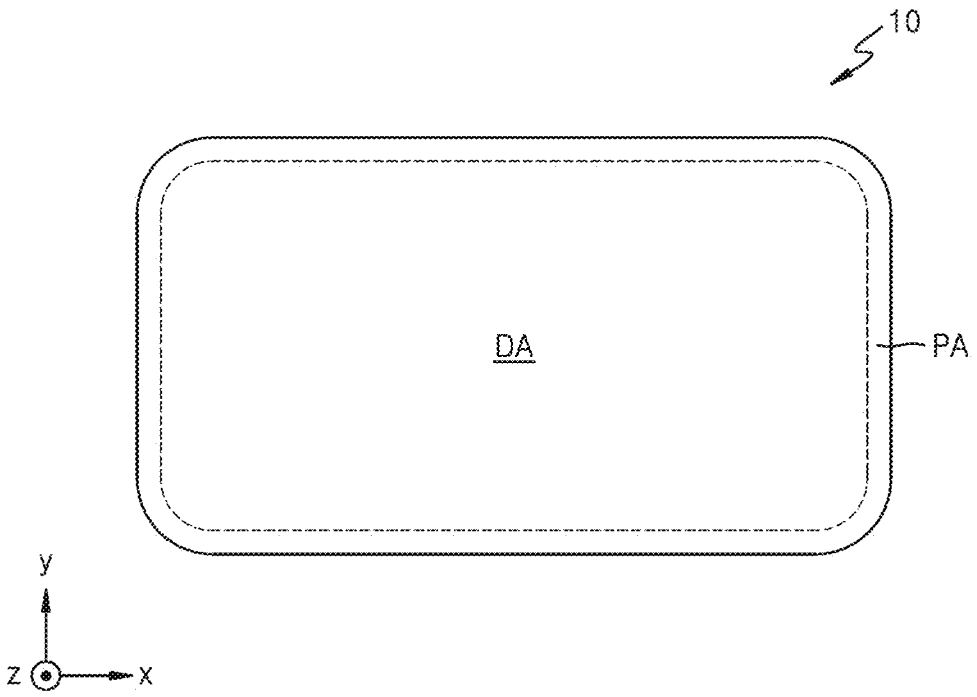
FIGS. 1A and 1B are schematic views of a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below, by referring to the figures, to explain aspects of the description.

In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

In the specification and the claims, the phrase “at least one of” is intended to include the meaning of “at least one selected from the group of” for the purpose of its meaning and interpretation. For example, “at least one of A and B” may be understood to mean “A, B, or A and B.”

As the disclosure allows for various changes and numerous embodiments, embodiments will be illustrated in the drawings and described in detail in the written description. Hereinafter, effects and features of the disclosure and a method for accomplishing them will be described more fully with reference to the accompanying drawings, in which embodiments of the disclosure are shown. The disclosure may, however, be embodied in many different forms and should not be construed as limited to the embodiments set forth herein.

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

As used herein, the singular forms “a,” “an,” and “the” are intended to include the plural forms as well, unless the context clearly indicates otherwise.

The terms “overlap” or “overlapped” mean that a first object may be above or below or to a side of a second object, and vice versa. Additionally, the term “overlap” may include layer, stack, face or facing, extending over, covering, or partly covering or any other suitable term as would be appreciated and understood by those of ordinary skill in the art.

The terms “face” and “facing” mean that a first element may directly or indirectly oppose a second element. In a case in which a third element intervenes between the first and second element, the first and second element may be understood as being indirectly opposed to one another, although still facing each other.

When an element is described as ‘not overlapping’ or ‘to not overlap’ another element, this may include that the elements are spaced apart from each other, offset from each other, or set aside from each other or any other suitable term as would be appreciated and understood by those of ordinary skill in the art.

The terms “comprises,” “comprising,” “includes,” and/or “including,” “has,” “have,” and/or “having,” and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

When it is referred that X and Y are connected, it may include the case where X and Y are directly or indirectly physically connected, the case where X and Y are functionally connected, and the case where X and Y are electrically connected. The case where X and Y are indirectly connected may include a case where another element is interposed between X and Y and thus X and Y are indirectly connected. Here, X and Y may be elements (for example, apparatuses, devices, circuits, wirings, electrodes, terminals, films, layers, and regions). Therefore, connection is not limited to preset connection relationship, for example, connection relationship shown in the drawings or detailed descriptions, and may include other connections relationships not shown in the drawings or detailed descriptions.

As used herein, when it is referred that X and Y are connected, it may mean that X and Y are electrically connected. The case where X and Y are electrically connected may include a case where X and Y are directly connected, and/or a case where another element is interposed between X and Y and thus X and Y are indirectly connected. The case where X and Y are indirectly connected may include a case where at least one device (for example, a switch, a transistor, a capacitance device, an inductor, a resistance device, and a diode) that enables electrical connection between X and Y is connected between X and Y.

“ON” or “on” used in association with an element state may be referred to as an activated state of an element, and “OFF” or “off” may be referred to as an inactivated state of an element. “ON” or “on” used in association with a signal received by an element may be referred to as a signal for activating the element, and “OFF” or “off” may be referred to as a signal for inactivating the element. An element may be activated by a high-level voltage or a low-level voltage. For example, a P-channel transistor (P-type transistor) is activated by a low-level voltage, and an N-channel transistor (N-type transistor) is activated by a high-level voltage. Therefore, it should be understood that an “ON” voltage for a P-channel transistor and an “ON” voltage for an N-channel transistor have opposite (high versus low) voltage levels. Hereinafter, a voltage that activates (turns on) a transistor is referred to as a gate-on voltage, and a voltage that deactivates (turns off) a transistor is referred to as a gate-off voltage.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
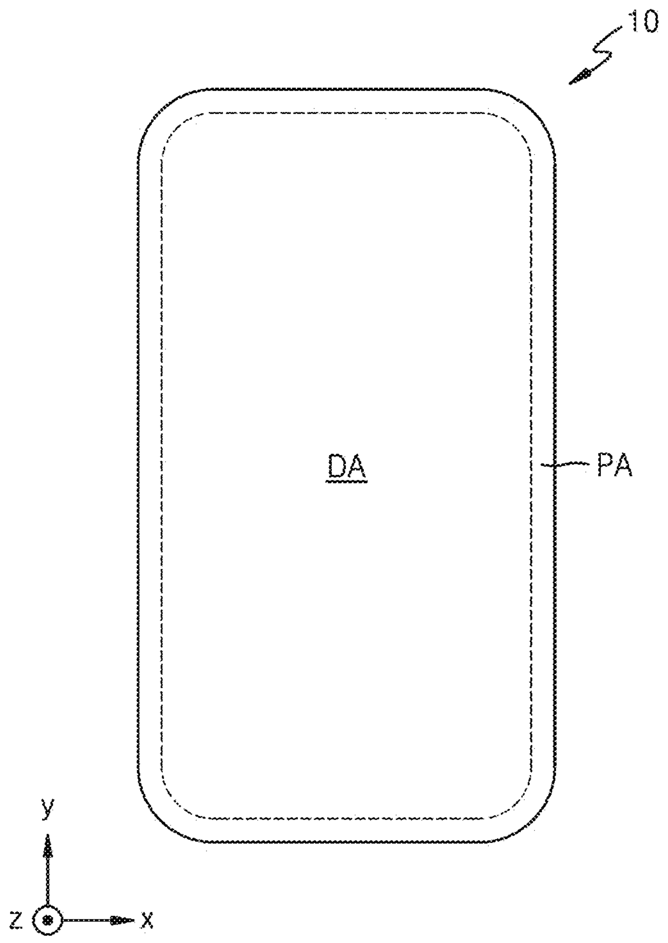
Figure 2:
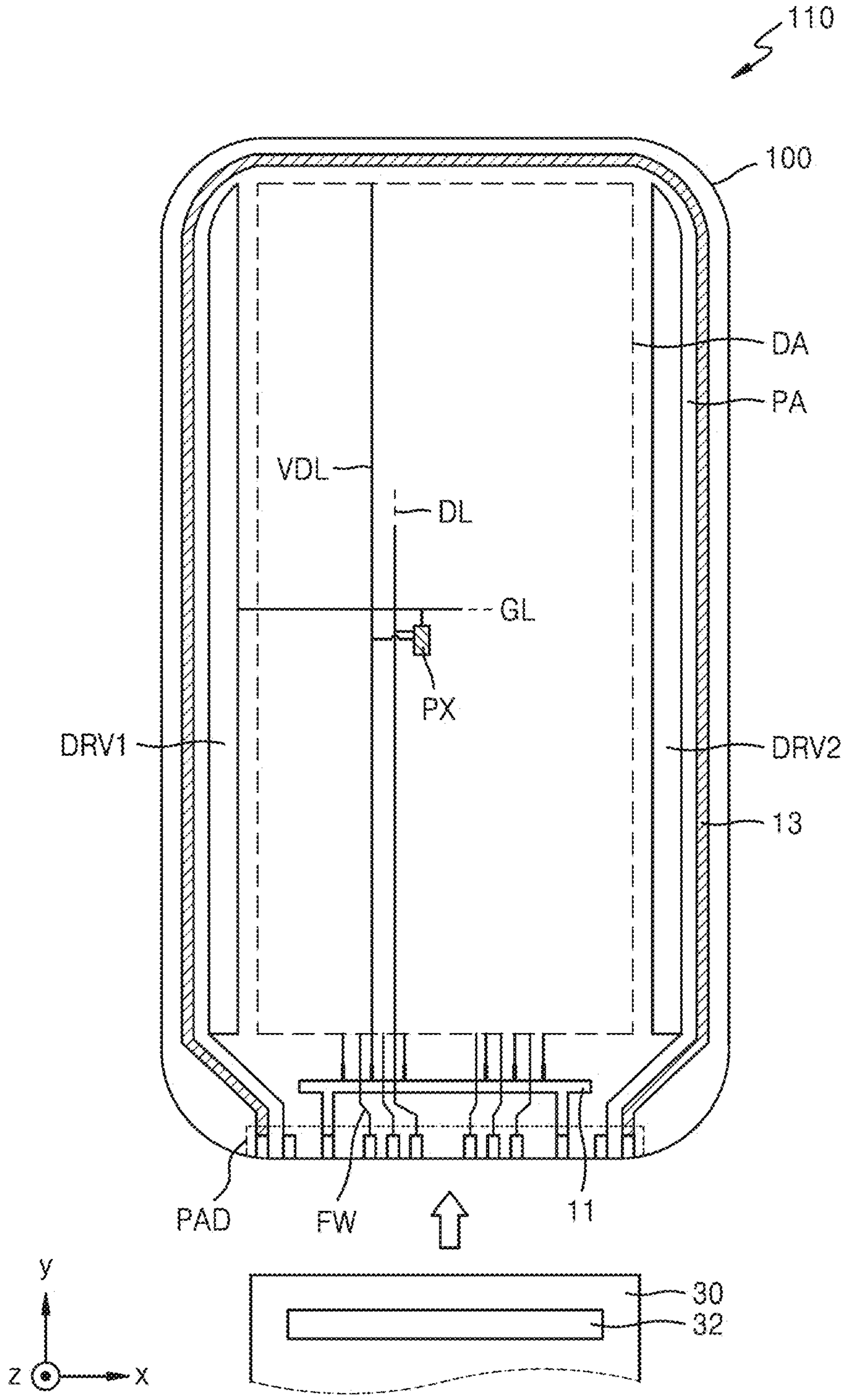
FIG. 2 is a schematic view of a display apparatus according to an embodiment.

FIGS. 1A and 1B are schematic views of a display apparatus 10 according to an embodiment. FIG. 2 is a schematic view of the display apparatus 10 according to an embodiment.

Referring to FIGS. 1A and 1B, the display apparatus 10 may include a display area DA displaying an image, and a peripheral area PA around the display area DA. The display area DA may be entirely surrounded by the peripheral area PA.

When viewing the display area DA in a plan view, the display area DA may have a rectangular shape. According to an embodiment, the display area DA may have a polygonal shape (for example, a triangular shape, a pentagonal shape, or a hexagonal shape), a circular shape, an elliptical shape, an irregular shape, or the like within the spirit and the scope of the disclosure. The display area DA may have a shape with round edge corners. According to an embodiment, the display apparatus 10 may have a display area DA having a shape in which a length in an x direction is greater than a length in a y direction, as shown in FIG. 1A. According to an embodiment, the display apparatus 10 may have a display area DA having a shape in which a length in the y direction is greater than a length in the x direction, as shown in FIG. 1B. FIGS. 1A, 1B, and 2 also include a z direction.

Referring to FIG. 2, the display apparatus 10 may include a display panel 110, and a cover window (not shown) that protects the display panel 110 may be arranged on the display panel 110.

Various elements that constitute the display panel 110 may be arranged on a substrate 100. The display area DA, and the peripheral area PA surrounding the display area DA may be defined on the substrate 100.

Pixels PX may be arranged in the display area DA. Each of the pixels PX may be connected to a corresponding gate line among the gate lines GL and a corresponding data line among the data lines DL. Each of the pixels PX may include an organic light-emitting diode OLED as a display element (light-emitting device), and the organic light-emitting diode OLED may be connected to a pixel circuit.

Pixel circuits that drive the pixels PX may be electrically connected to outer circuits arranged in the peripheral area PA, respectively. A first gate driver circuit DRV1, a second gate driver circuit DRV2, a terminal unit PAD, a driving voltage supply line 11, and a common voltage supply line 13 may be arranged in the peripheral area PA.

The first gate driver circuit DRV1 and the second gate driver circuit DRV2 may be positioned to face each other with the display area DA arranged between the first gate driver circuit DRV1 and the second gate driver circuit DRV2. The pixels PX of the display area DA may be electrically connected to the first gate driver circuit DRV1 and the second gate driver circuit DRV2. The first gate driver circuit DRV1 and the second gate driver circuit DRV2 may be connected to gate lines GL, and may apply a gate signal to each of the pixel circuits that drive the pixels PX through the gate lines GL.

The terminal unit PAD may be arranged on one side or a side of the substrate 100. The terminal unit PAD may be exposed without being covered by an insulating layer, and may be connected to a display circuit board 30. A display driver 32 may be arranged on the display circuit board 30.

The display driver 32 may include a data driver circuit, the data driver circuit may be connected to data lines DL and may generate data signals, and the generated data signals may be transmitted to the pixel circuits of the pixels PX via fanout lines FW and data lines DL connected to the fanout lines FW.

The display driver 32 may include a power supply circuit, and the power supply circuit may supply a first power supply voltage to the driving voltage supply line 11 and may supply a second power supply voltage to the common voltage supply line 13. The first power supply voltage may be applied to the pixel circuits of the pixels PX via a driving voltage line VDL connected to the driving voltage supply line 11, and the second power supply voltage may be applied to an opposite electrode of each display element via the common voltage supply line 13.

The display driver 32 may include a controller, and the controller may generate a control signal transmitted to the first gate driver circuit DRV1, the second gate driver circuit DRV2, the data driver circuit, and the power supply circuit.

The driving voltage supply line 11 may be connected to the terminal unit PAD, and may extend on a lower side of the display area DA in the x direction. The common voltage supply line 13 may be connected to the terminal unit PAD, and may have a loop shape of which one side or a side is open, and thus may surround a portion of the display area DA.

A portion or the entirety of the first gate driver circuit DRV1 and the second gate driver circuit DRV2 may be directly formed in the peripheral area PA of the substrate 100 during a process of forming a pixel circuit in the display area DA of the substrate 100. The display driver 32 may be formed in an integrated circuit chip, and may be arranged on the display circuit board 30 electrically connected to the terminal unit PAD arranged on one side or a side of the substrate 100. The display circuit board 30 may be a flexible printed circuit board (FPCB). According to an embodiment, the display driver 32 may be directly arranged on the substrate 100 by using a chip on glass (COG) or chip on plastic (COP) method.

According to an embodiment, transistors included in pixel circuits of the display area DA, and transistors included in an outer circuit of the peripheral area PA, for example, the first gate driver circuit DRV1 and the second gate driver circuit DRV2, may be P-channel thin-film transistors and/or N-channel thin-film transistors. The transistors included in the outer circuit of the peripheral area PA may be formed simultaneously with the transistors included in the pixel circuits of the display area DA, in the same process as a process of forming the transistors included in the pixel circuits of the display area DA.

An N-channel thin-film transistor may be an oxide thin-film transistor. The oxide thin-film transistor may have a semiconductor layer that includes an oxide. An oxide semiconductor may include Zn oxide, In—Zn oxide, Ga—In—Zn oxide, or the like, as a Zn oxide-based material. According to an embodiment, the oxide semiconductor may be an In—Ga—Zn—O (IGZO) semiconductor containing metals, such as In and Ga, in ZnO. According to an embodiment, the oxide thin-film transistor may be a low temperature polycrystalline oxide (LTPO) thin-film transistor. A P-channel thin-film transistor may be a silicon thin-film transistor. The silicon thin-film transistor may be a low temperature poly-silicon (LTPS) thin-film transistor in which a semiconductor layer includes amorphous silicon, polysilicon, or the like within the spirit and the scope of the disclosure.

The P-channel transistor may be turned on in case that a gate signal is at a low voltage level, and the N-channel transistor may be turned on in case that the gate signal is at a high voltage level.

FIG. 2 illustrates an example in which a pixel PX is connected to one gate line GL, but embodiments are not limited thereto. A pixel PX may be connected to one or more gate lines GL.

Figure 3:
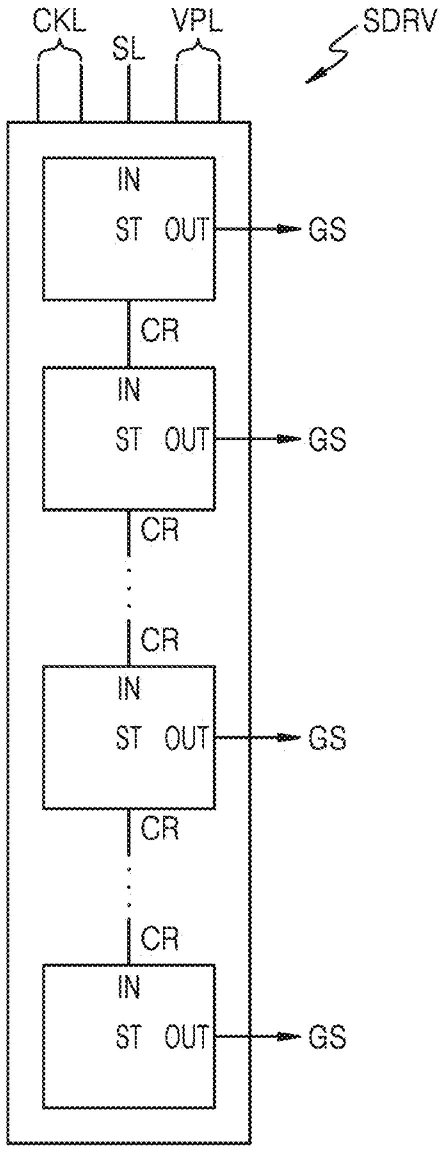
FIG. 3 is a schematic diagram of a gate driver circuit according to an embodiment.
Figure 4:
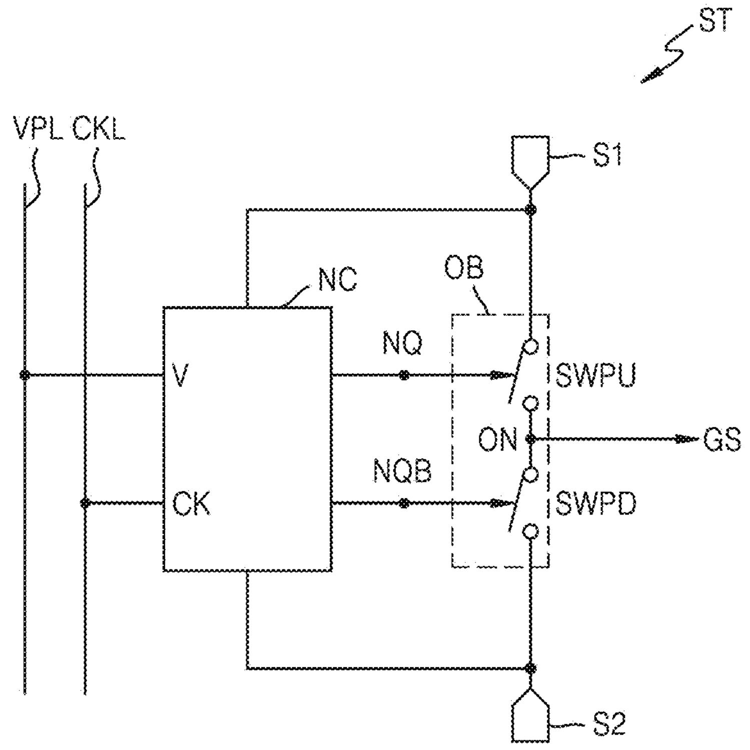
FIG. 4 is a schematic diagram of an arbitrary stage constituting a gate driver circuit according to an embodiment.

FIG. 3 is a schematic diagram of a gate driver circuit according to an embodiment. FIG. 4 is a schematic diagram of an arbitrary stage that constitutes the gate driver circuit according to an embodiment.

Each of the first gate driver circuit DRV1 and the second gate driver circuit DRV2 may include at least one driver circuit SDRV, and the driver circuit SDRV may include stages ST. As illustrated in FIG. 3, each of the stages ST may be connected to at least one clock line CKL and at least one voltage line VPL. Each of the stages ST may receive at least one clock signal from the at least one clock line CKL, and may receive at least one voltage signal from the at least one voltage line VPL. A start signal line SL may be connected to an input terminal IN of a first stage ST among the stages ST, and a start signal may be input to the start signal line SL. A carry signal CR output by a previous stage ST to respective input terminals IN of a second stage ST and its subsequent stages ST among the stages ST may be input as a start signal. A gate line may be connected to an output terminal OUT of each of the stages ST, and a gate signal GS may be output to the gate line. According to an embodiment, the carry signal CR may be a gate signal GS output by the previous stage ST.

Referring to FIG. 4, the stage ST may include a node controller NC controlling respective voltage levels of a first control node NQ and a second control node NQB, and an output unit OB including a pull-up transistor SWPU and a pull-down transistor SWPD.

A voltage terminal V of the node controller NC may be connected to the voltage line VPL, and a voltage signal of a first voltage level or a second voltage level may be input from the voltage line VPL. A clock terminal CK of the node controller NC may be connected to the voltage line VPL, and a clock signal may be input from the clock line CKL.

The pull-up transistor SWPU may be turned on or off according to the voltage level of the first control node NQ, and may be connected between a terminal S1 and an output node ON to output a first signal applied to the terminal S1 as the gate signal GS. The pull-down transistor SWPD may be turned on or off according to the voltage level of the second control node NQB, and may be connected between a terminal S2 and the output node ON to output a second signal applied to the terminal S2 as the gate signal GS. According to an embodiment, the first signal and the second signal may be voltage signals of a first voltage level or a second voltage level, or may be clock signals in which the first voltage level and the second voltage level swing (alternate with) each other. According to an embodiment, the first voltage level may be a high voltage level and the second voltage level may be a low voltage level.

Figure 5:
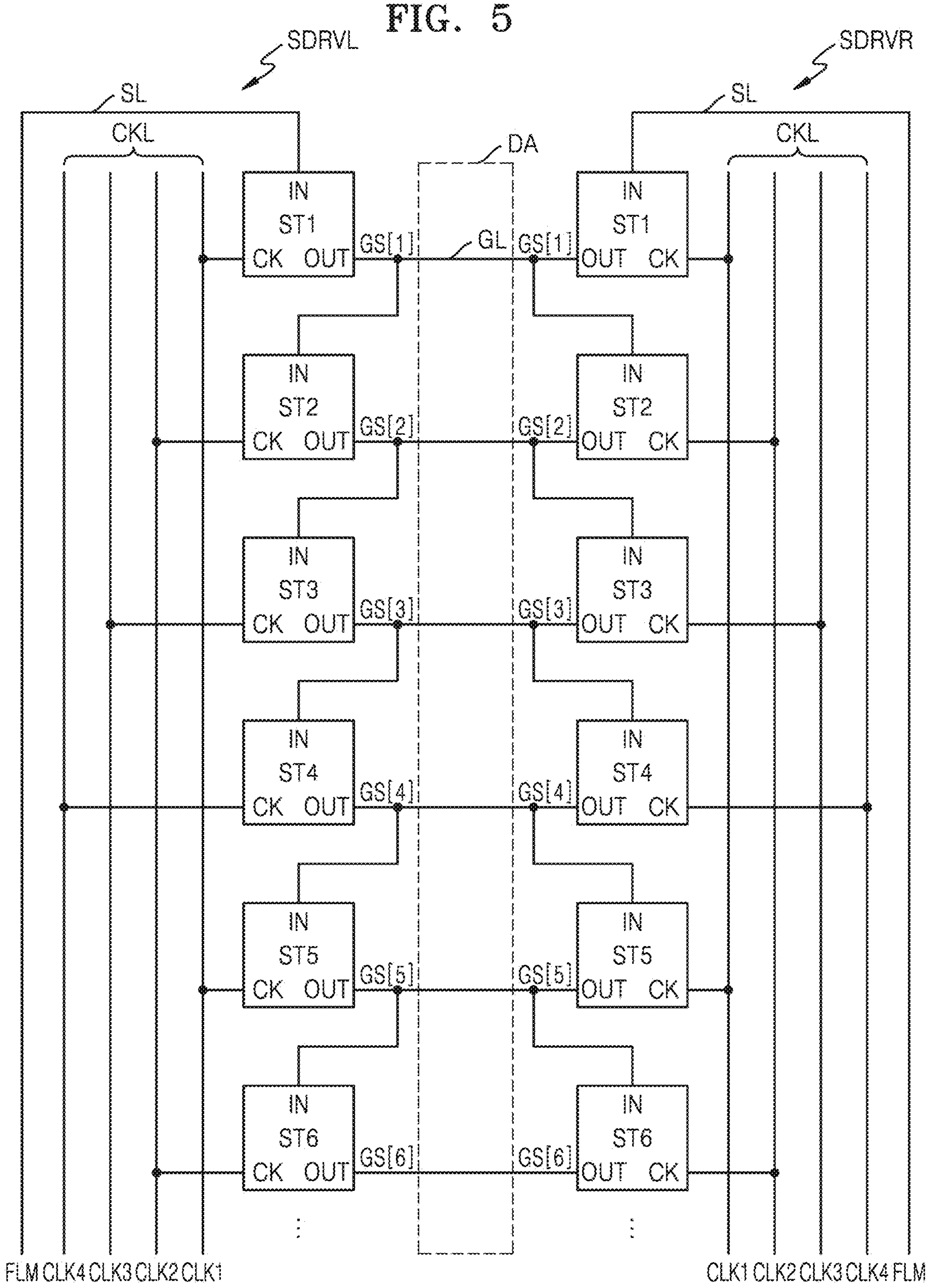
FIG. 5 is a schematic diagram of a gate driver circuit according to an embodiment.
Figure 6:
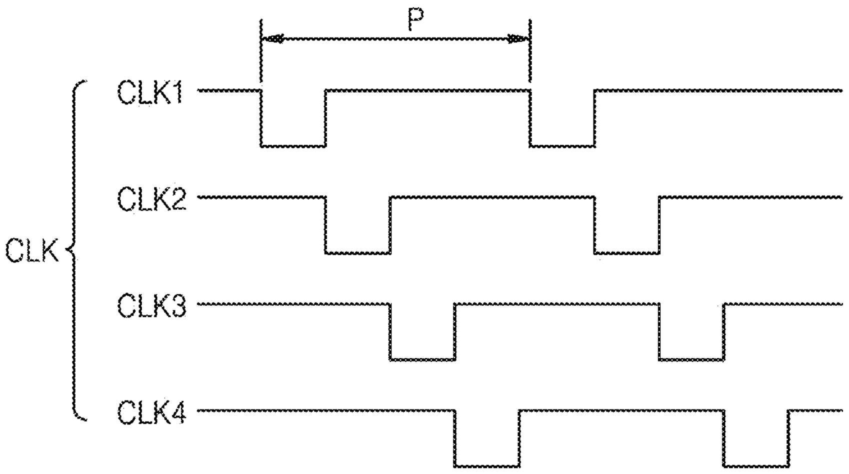
FIGS. 6 and 7 are schematic views illustrating input signals and output signals of the gate driver circuit of FIG. 5.
Figure 7:
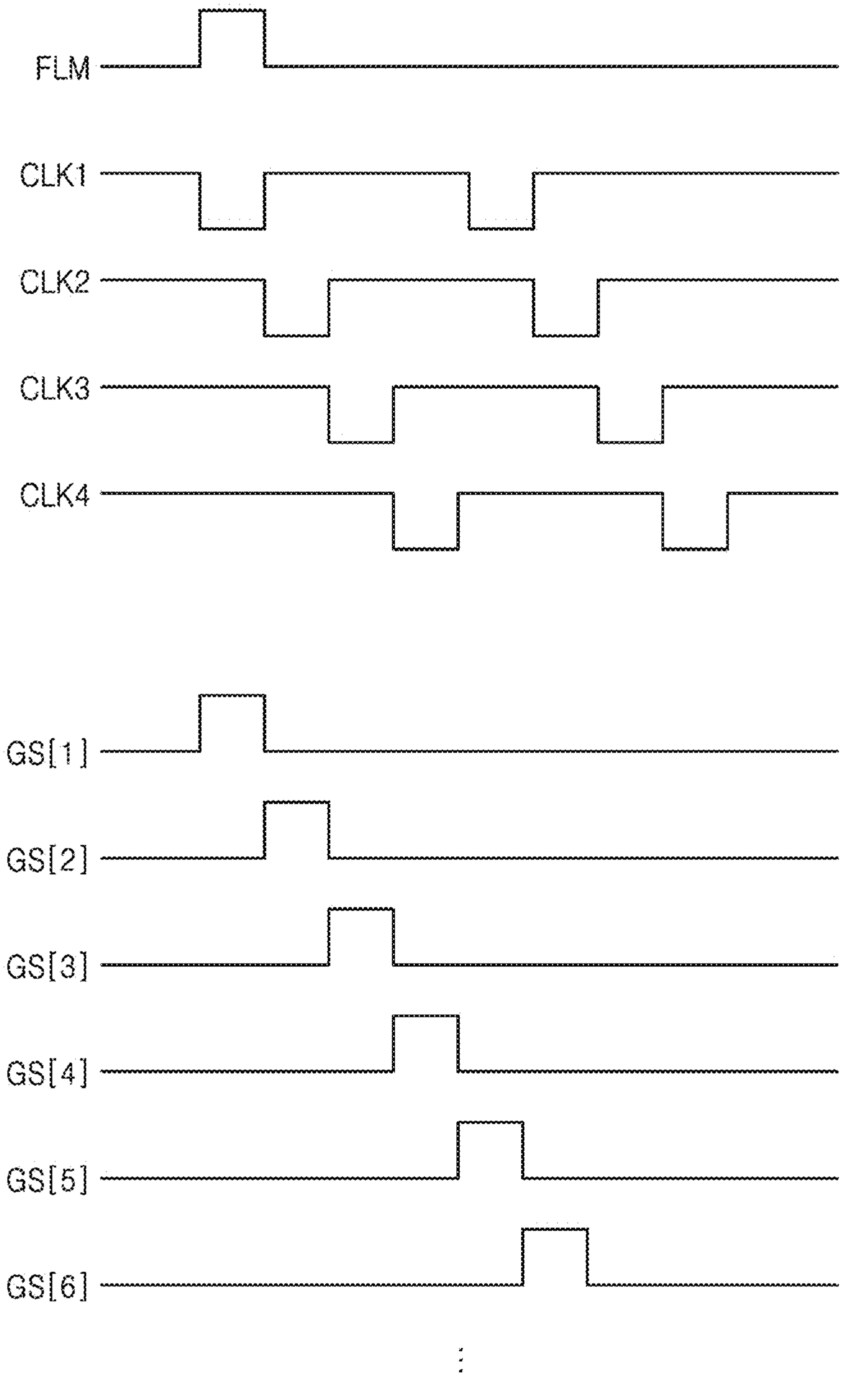

FIG. 5 is a schematic diagram of a gate driver circuit according to an embodiment. FIGS. 6 and 7 are schematic views illustrating input signals and output signals of the gate driver circuit. For convenience of explanation, a voltage signal input from the power supply circuit will now be omitted.

According to an embodiment, the first gate driver circuit DRV1 and the second gate driver circuit DRV2 may each include a non-interlaced driver circuit in which stages outputting the same gate signal are sequentially arranged.

As illustrated in FIG. 5, the first gate driver circuit DRV1 may include a left driver circuit SDRVL, and the second gate driver circuit DRV2 may include a right driver circuit SDRVR. The left driver circuit SDRVL and the right driver circuit SDRVR may each include stages ST1, ST2, ST3, ST4, ST5, ST6, . . . . The left driver circuit SDRVL and the right driver circuit SDRVR may be symmetrical with each other with the display area DA arranged between the left driver circuit SDRVL and the right driver circuit SDRVR.

Output terminals OUT of corresponding stages of the stages ST1, ST2, ST3, ST4, ST5, ST6, . . . , of the left driver circuit SDRVL and the stages ST1, ST2, ST3, ST4, ST5, ST6, . . . , of the right driver circuit SDRVR may be connected to the same gate line GL. For example, a second stage ST2 of the left driver circuit SDRVL and a second stage ST2 of the right driver circuit SDRVR may be connected to a gate line GL arranged in a second row.

The stages ST1, ST2, ST3, ST4, ST5, ST6, . . . , may be connected to a clock line CKL to which a clock signal CLK is input. As illustrated in FIG. 6, according to an embodiment, the clock signal CLK may include first, second, third, and fourth clock signals CLK1, CLK2, CLK3, and CLK4. First, second, third, and fourth clock signal lines may be sequentially connected to every four stages of the stages ST1, ST2, ST3, ST4, ST5, ST6, . . . , and the first, second, third, and fourth clock signals CLK1, CLK2, CLK3, and CLK4 may be sequentially input to every four stages of the stages ST1, ST2, ST3, ST4, ST5, ST6, . . . .

The first, second, third, and fourth clock signals CLK1, CLK2, CLK3, and CLK4 may be square wave signals that repeat a high-level voltage and a low-level voltage. The first, second, third, and fourth clock signals CLK1, CLK2, CLK3, and CLK4 may be signals having the same waveform, the same period P, and a phase shifted (phase delayed) by a ¼ period.

The start signal line SL may be connected to an input terminal IN of the first stage ST1 among the stages ST1, ST2, ST3, ST4, ST5, ST6, . . . , and a start signal FLM may be input through the start signal line SL. An output signal of a previous stage, for example, the gate signal GS, may be input to an input terminal IN of each of the second and subsequent stages ST2, ST3, ST4, ST5, ST6, . . . , among the stages ST1, ST2, ST3, ST4, ST5, ST6, . . . . For example, a gate signal GS [1] output by the first stage ST1 may be input to the input terminal IN of the second stage ST2, and a gate signal GS [2] output by the second stage ST2 may be input to the input terminal IN of a third stage ST3.

The stages ST1, ST2, ST3, ST4, ST5, ST6, . . . , may be driven in synchronization with the start signal FLM, and may generate gate signals GS [1], GS [2], GS [3], GS [4], GS [5], GS [6], . . . and sequentially output the same to gate lines GL. As illustrated in FIG. 7, the gate signals GS [1], GS [2], GS [3], GS [4], GS [5], GS [6], . . . , output by the stages ST1, ST2, ST3, ST4, ST5, ST6, . . . , may be sequentially shifted in correspondence with the first, second, third, and fourth clock signals CLK1, CLK2, CLK3, and CLK4. FIG. 7 illustrates an example in which the stages ST1, ST2, ST3, ST4, ST5, ST6, . . . , sequentially output the gate signals GS [1], GS [2], GS [3], GS [4], GS [5], GS [6], . . . , of a high level.

The gate signal GS output by the left driver circuit SDRVL and the gate signal GS output by the right driver circuit SDRVR may be the same as each other. The gate signal GS output by the stages ST1, ST2, ST3, ST4, ST5, ST6, . . . , of the left driver circuit SDRVL and the gate signal GS output by the stages ST1, ST2, ST3, ST4, ST5, ST6, . . . , of the right driver circuit SDRVR may be the same as each other. The gate signals being the same as each other may mean that transistors of pixels to which the gate signals are input are identical with each other. For example, a gate signal output by the first stage ST1 may be input to a gate of a switching transistor that transmits a data signal included in a pixel circuit of a first row, and a gate signal output by the second stage ST2 may be input to a gate of a switching transistor that transmits a data signal included in a pixel circuit of a second row.

Figure 8:
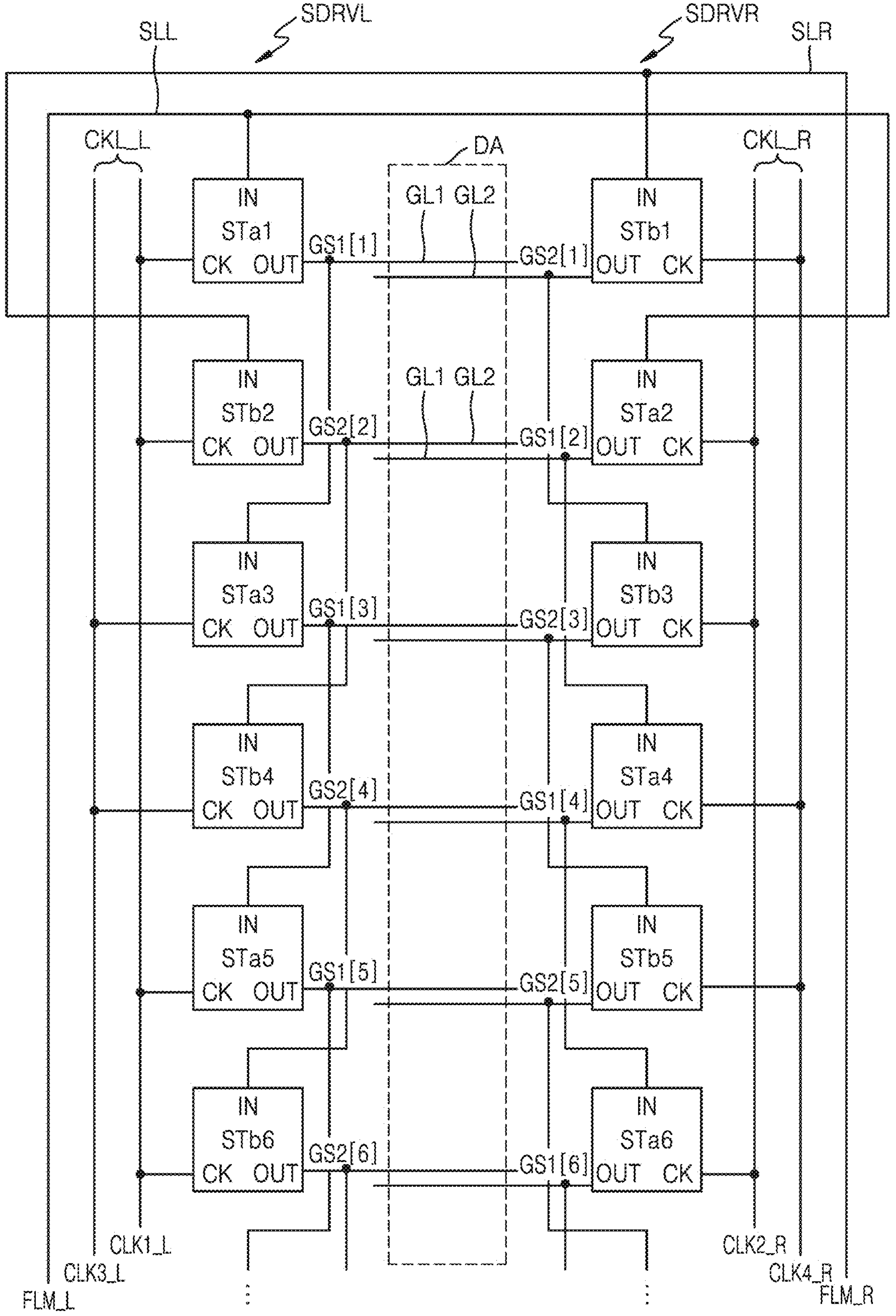
FIG. 8 is a schematic diagram of a gate driver circuit according to an embodiment.
Figure 9:
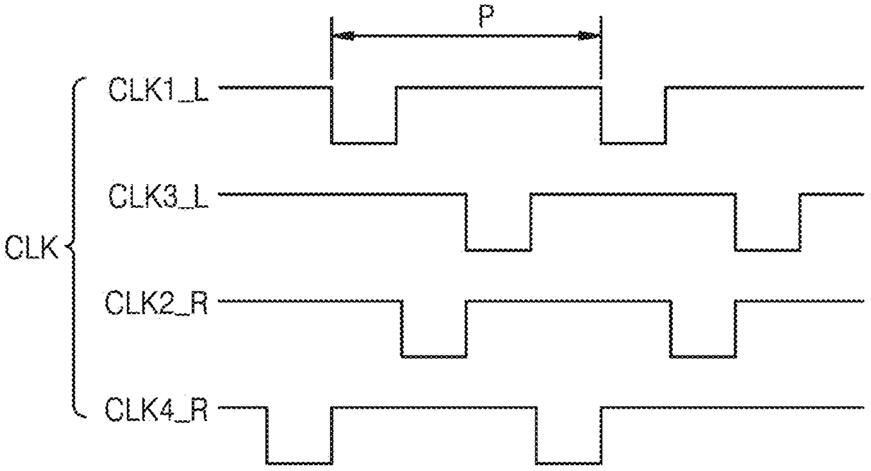
FIGS. 9 through 11 are schematic views illustrating input signals and output signals of the gate driver circuit of FIG. 8.
Figure 10:
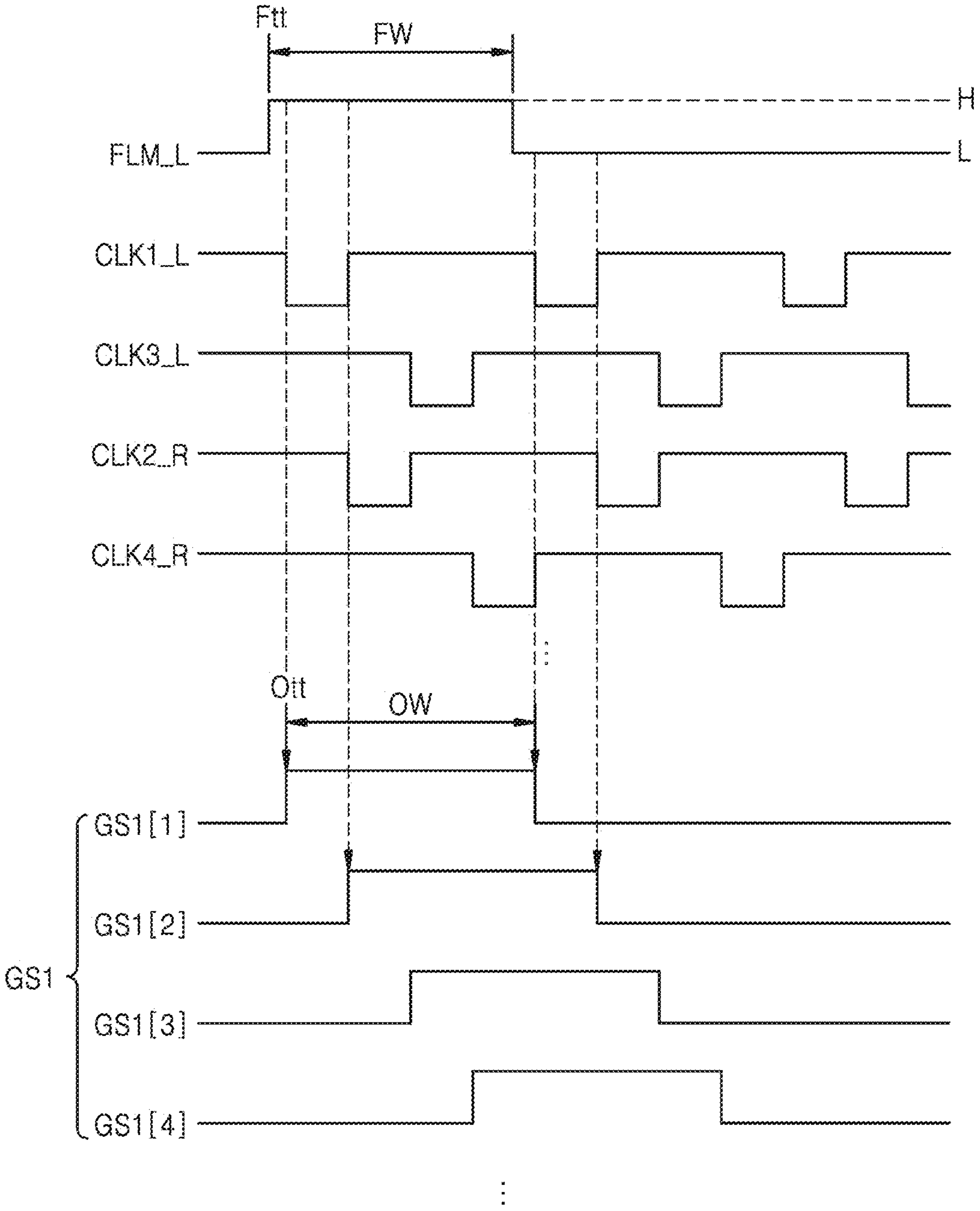
Figure 11:
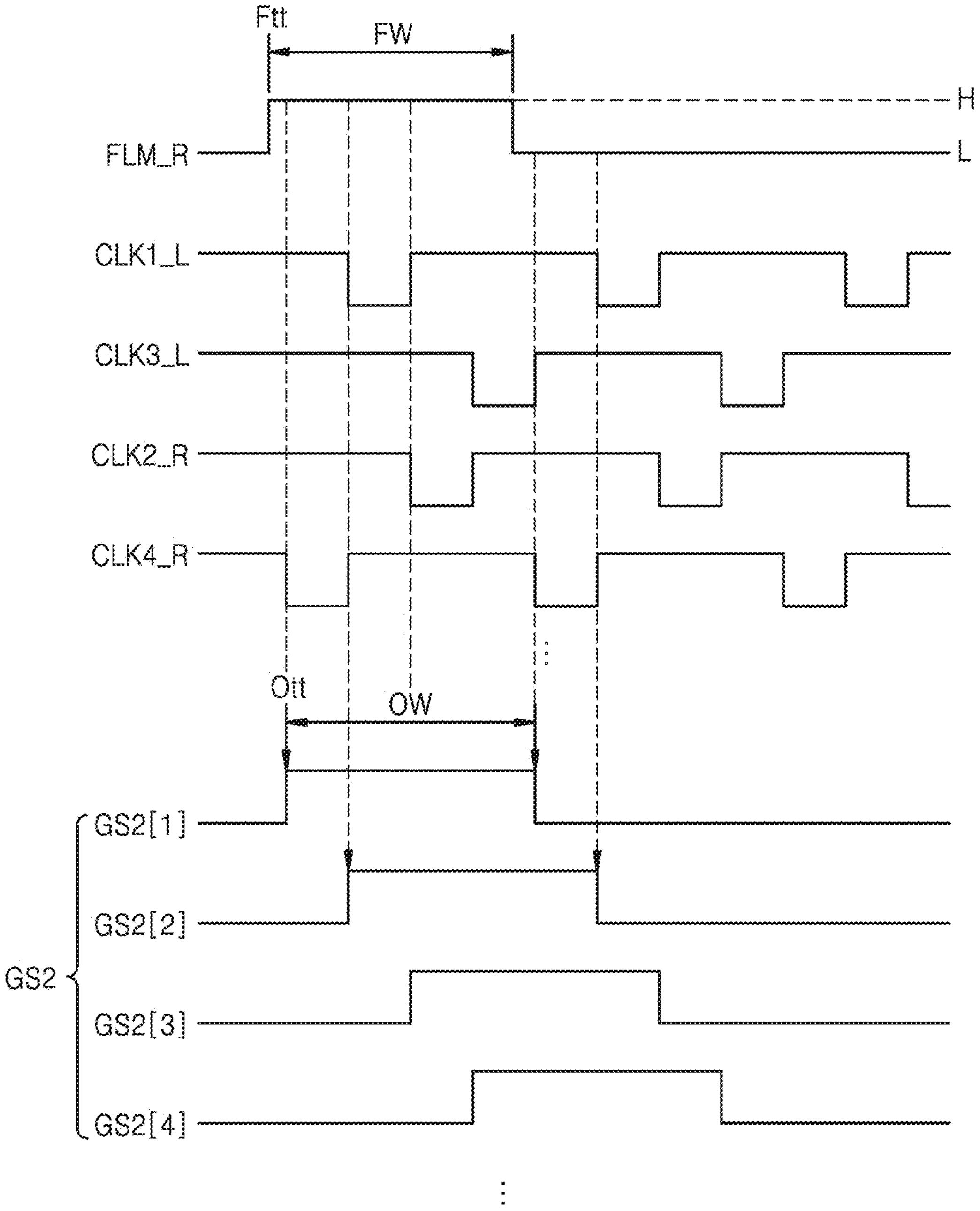

FIG. 8 is a schematic diagram of a gate driver circuit according to an embodiment. FIGS. 9 through 11 are schematic views illustrating input signals and output signals of the gate driver circuit.

According to an embodiment, the first gate driver circuit DRV1 and the second gate driver circuit DRV2 may each include an interlaced driver circuit in which stages outputting different gate signals alternate with each other.

As illustrated in FIG. 8, the first gate driver circuit DRV1 may include a left driver circuit SDRVL, and the second gate driver circuit DRV2 may include a right driver circuit SDRVR. Stages that output different gate signals may be arranged in a distributed manner in the left driver circuit SDRVL and the right driver circuit SDRVR.

For example, the left driver circuit SDRVL may include odd-numbered first stages STa1, STa3, STa5 . . . , among first stages STa1, STa2, STa3, STa4, STa5, STa6, . . . , outputting a first gate signal GS1, and even-numbered second stages STb2, STb4, STb6, . . . , among second stages STb1, STb2, STb3, STb4, STb5, STb6, . . . , outputting a second gate signal GS2. The odd-numbered first stages STa1, STa3, STa5 . . . , and the even-numbered second stages STb2, STb4, STb6 . . . , may alternate with each other.

The right driver circuit SDRVR may include odd-numbered second stages STb1, STb3, STb5 . . . , among the second stages STb1, STb2, STb3, STb4, STb5, STb6, . . . , outputting the second gate signal GS2, and even-numbered first stages STa2, STa4, STa6, . . . , among the first stages STa1, STa2, STa3, STa4, STa5, STa6, . . . , outputting the first gate signal GS1. The odd-numbered second stages STb1, STb3, STb5, . . . , and the even-numbered first stages STa2, STa4, STa6, . . . , may alternate with each other.

The odd-numbered first stages STa1, STa3, STa5, . . . , of the left driver circuit SDRVL may be connected to first gate lines GL1, and the even-numbered second stages STb2, STb4, STb6, . . . , of the left driver circuit SDRVL may be connected to second gate lines GL2. The odd-numbered second stages STb1, STb3, STb5, . . . , of the right driver circuit SDRVR may be connected to the second gate lines GL2, and the even-numbered first stages STa2, STa4, STa6, . . . , of the right driver circuit SDRVR may be connected to the first gate lines GL1.

The first stages STa1, STa2, STa3, STa4, STa5, STa6, . . . , and the second stages STb1, STb2, STb3, STb4, STb5, STb6, . . . , may be connected to a clock line CKL to which a clock signal CLK is input. The clock line CKL may include a left clock line CKL_L arranged on the left side and a right clock line CKL_R arranged on the right side.

As illustrated in FIG. 9, according to an embodiment, the clock signal CLK may include first, second, third, and fourth clock signals CLK1_L, CLK2_R, CLK3_L, and CLK4_R. The first, second, third, and fourth clock signals CLK1_L, CLK2_R, CLK3_L, and CLK4_R may be square wave signals that repeat a high-level voltage and a low-level voltage. The first, second, third, and fourth clock signals CLK1_L, CLK2_R, CLK3_L, and CLK4_R may be signals having the same waveform, the same period P, and a phase shifted (phase delayed) by a ¼ period.

The odd-numbered first stages STa1, STa3, STa5, . . . , and the even-numbered second stages STb2, STb4, STb6, . . . , may be connected to left clock lines CKL_L to which the first clock signal CLK1_L and the third clock signal CLK3_L are input, and the first clock signal CLK1_L and the third clock signal CLK3_L may be input alternately. For example, the first clock signal CLK1_L may be input to the first first stage STa1 and the second second stage STb2, and the third clock signal CLK3_L may be input to the third first stage STa3 and the fourth second stage STb4.

The odd-numbered second stages STb1, STb3, STb5 . . . , and the even-numbered first stages STa2, STa4, STa6, . . . , may be connected to right clock lines CKL_R to which the second clock signal CLK2_R and the fourth clock signal CLK4_R are input, and the second clock signal CLK2_R and the fourth clock signal CLK4_R may be input alternately. For example, the fourth clock signal CLK4_R may be input to the first second stage STb1 and the fourth first stage STa4, and the second clock signal CLK2_R may be input to the second first stage STa2 and the third second stage STb3.

The first clock signal CLK1_L, the second clock signal CLK2_R, the third clock signal CLK3_L, and the fourth clock signal CLK4_R may be sequentially input to the first stages STa1, STa2, STa3, STa4, STa5, STa6, . . . . The fourth clock signal CLK4_R, the first clock signal CLK1_L, the second clock signal CLK2_R, and the third clock signal CLK3_L may be sequentially input to the second stages STb1, STb2, STb3, STb4, STb5, STb6 . . . .

A start signal line SLL may be connected to an input terminal IN of the first first stage STa1 arranged first among the odd-numbered first stages STa1, STa3, STa5, . . . , of the left driver circuit SDRVL, and an input terminal IN of the second first stage STa2 arranged first among the even-numbered first stages STa2, STa4, STa6, . . . , of the right driver circuit SDRVR, and a start signal FLM_L may be input through the start signal line SLL.

A start signal line SLR may be connected to an input terminal IN of the first second stage STb1 arranged first among the odd-numbered second stages STb1, STb3, STb5, . . . , of the right driver circuit SDRVR, and an input terminal IN of the second second stage STb2 arranged first among the even-numbered second stages STb2, STb4, STb6, . . . , of the left driver circuit SDRVL, and a start signal FLM_R may be input through the start signal line SLR.

An output signal of an odd-numbered previous first stage, for example, the first gate signal GS1, may be input to an input terminal IN of each of first stages STa3, STa5, . . . , arranged at the second and subsequent positions among the odd-numbered first stages STa1, STa3, STa5, . . . . An output signal of an even-numbered previous second stage, for example, the second gate signal GS2, may be input to an input terminal IN of each of second stages STb4, STb6, . . . , arranged at the second and subsequent positions among the even-numbered second stages STb2, STb4, STb6, . . . . For example, a first gate signal GS1[1] output by the first first stage STa1 may be input to an input terminal IN of the third first stage STa3, and a second gate signal GS2[2] output by the second second stage STb2 may be input to an input terminal IN of the fourth second stage STb4.

An output signal of an odd-numbered previous second stage, for example, the second gate signal GS2, may be input to an input terminal IN of each of second stages STb3, STb5, . . . , arranged at the second and subsequent positions among the odd-numbered second stages STb1, STb3, STb5, . . . . An output signal of an even-numbered previous first stage, for example, the first gate signal GS1, may be input to an input terminal IN of each of first stages STa4, STa6, . . . , arranged at the second and subsequent positions among the even-numbered first stages STa2, STa4, STa6, . . . . For example, a second gate signal GS2[1] output by the first second stage STb1 may be input to an input terminal IN of the third second stage STb3, and a first gate signal GS1[2] output by the second first stage STa2 may be input to an input terminal IN of the fourth first stage STa4.

The first stages STa1, STa2, STa3, STa4, STa5, STa6, . . . , may be driven in synchronization with the start signal FLM_L, and left first stages and right first stages may alternately generate first gate signals GS1[1], GS1[2], GS1[3], GS1[4], GS1[5], GS1[6], . . . and sequentially output the same to the first gate lines GL1. As illustrated in FIG. 10, the first gate signals GS1[1], GS1[2], GS1[3], GS1[4], . . . output by the first stages STa1, STa2, STa3, STa4, STa5, STa6, . . . , may be sequentially shifted in accordance with the order of the first clock signal CLK1_L, the second clock signal CLK2_R, the third clock signal CLK3_L, and the fourth clock signal CLK4_R. FIG. 10 illustrates an example in which the first stages STa1, STa2, STa3, STa4, STa5, STa6, . . . , sequentially output first gate signals GS1[1], GS1[2], GS1[3], GS1[4], GS1[5], GS1[6], . . . , of high levels alternately from left side to right side.

The second stages STb1, STb2, STb3, STb4, STb5, STb6, . . . , may be driven in synchronization with the start signal FLM_R, and right second stages and left second stages may alternately generate second gate signals GS2[1], GS2[2], GS2[3], GS2[4], GS2[5], GS2[6], . . . , and sequentially output the same to the second gate lines GL2. As illustrated in FIG. 11, the second gate signals GS2[1], GS2[2], GS2[3], GS2[4], GS2[5], GS2[6] . . . output by the second stages STb1, STb2, STb3, STb4, STb5, STb6, . . . , may be sequentially shifted in accordance with the order of the fourth clock signal CLK4_R, the first clock signal CLK1_L, the second clock signal CLK2_R, and the third clock signal CLK3_L. FIG. 11 illustrates an example in which the second stages STb1, STb2, STb3, STb4, STb5, STb6, . . . sequentially output second gate signals GS2[1], GS2[2], GS2[3], GS2[4], GS2[5], GS2[6], . . . , of high levels alternately from right side to left side.

The first gate signal GS1 and the second gate signal GS2 output by the left driving circuit SDRVL and the right driving circuit SDRVR may be different gate signals. For example, first gate signals output by the first stages STa1, STa2, STa3, STa4, STa5, STa6, . . . , may be input to a gate of a switching transistor for compensating for a threshold voltage of a driving transistor included in a pixel circuit, and second gate signals output by the second stages STb1, STb2, STb3, STb4, STb5, STb6, . . . , may be input to a gate of a switching transistor for initializing a gate voltage of the driving transistor included in the pixel circuit.

The first first stage STa1 arranged on the left side and the second first stage STa2 arranged on the right side may share the start signal line SLL and the start signal FLM_L.

Referring to FIG. 10, the first first stage STa1 may output the first gate signal GS1[1] that transits from a low-level voltage to a high-level voltage in synchronization with a falling time of the first clock signal CLK1_L in case that the start signal FLM_L is a high-level voltage H. The first first stage STa1 may output the first gate signal GS1[1] that transits from a high-level voltage to a low-level voltage in synchronization with the falling time of the first clock signal CLK1_L in case that the start signal FLM_L is a low-level voltage L.

The second first stage STa2 may output the first gate signal GS1[2] that transits from a low-level voltage to a high-level voltage in synchronization with a falling time of the second clock signal CLK2_R in case that the start signal FLM_L is a high-level voltage H. The second first stage STa2 may output the first gate signal GS1[2] that transits from a high-level voltage to a low-level voltage in synchronization with the falling time of the second clock signal CLK2_R in case that the start signal FLM_L is a low-level voltage L.

The first second stage STb1 arranged on the right side and the second second stage STb2 arranged on the left side may share the start signal line SLR and the start signal FLM_R.

Referring to FIG. 11, the first second stage STb1 may output the second gate signal GS2[1] that transits from a low-level voltage to a high-level voltage in synchronization with a falling time of the fourth clock signal CLK4_R in case that the start signal FLM_R is a high-level voltage H. The first second stage STb1 may output the second gate signal GS2[1] that transits from a high-level voltage to a low-level voltage in synchronization with the falling time of the fourth clock signal CLK4_R in case that the start signal FLM_R is a low-level voltage L.

The second second stage STb2 may output the second gate signal GS2[2] that transits from a low-level voltage to a high-level voltage in synchronization with a falling time of the first clock signal CLK1_L in case that the start signal FLM_R is a high-level voltage H. The second second stage STb2 may output the second gate signal GS2[2] that transits from a high-level voltage to a low-level voltage in synchronization with the falling time of the first clock signal CLK1_L in case that the start signal FLM_R is a low-level voltage L.

As illustrated in FIGS. 10 and 11, in an interlaced driver circuit, an output timing Ott of an output signal (the first gate signal GS1 and the second gate signal GS2) and a width OW of the output signal (the first gate signal GS1 and the second gate signal GS2) may be determined according to a combination of a time point Ftt at which the start signals FLM_L and FLM_R are input, a width FW of each of the start signals FLM_L and FLM_R, and the clock signal CLK.

Figure 12:
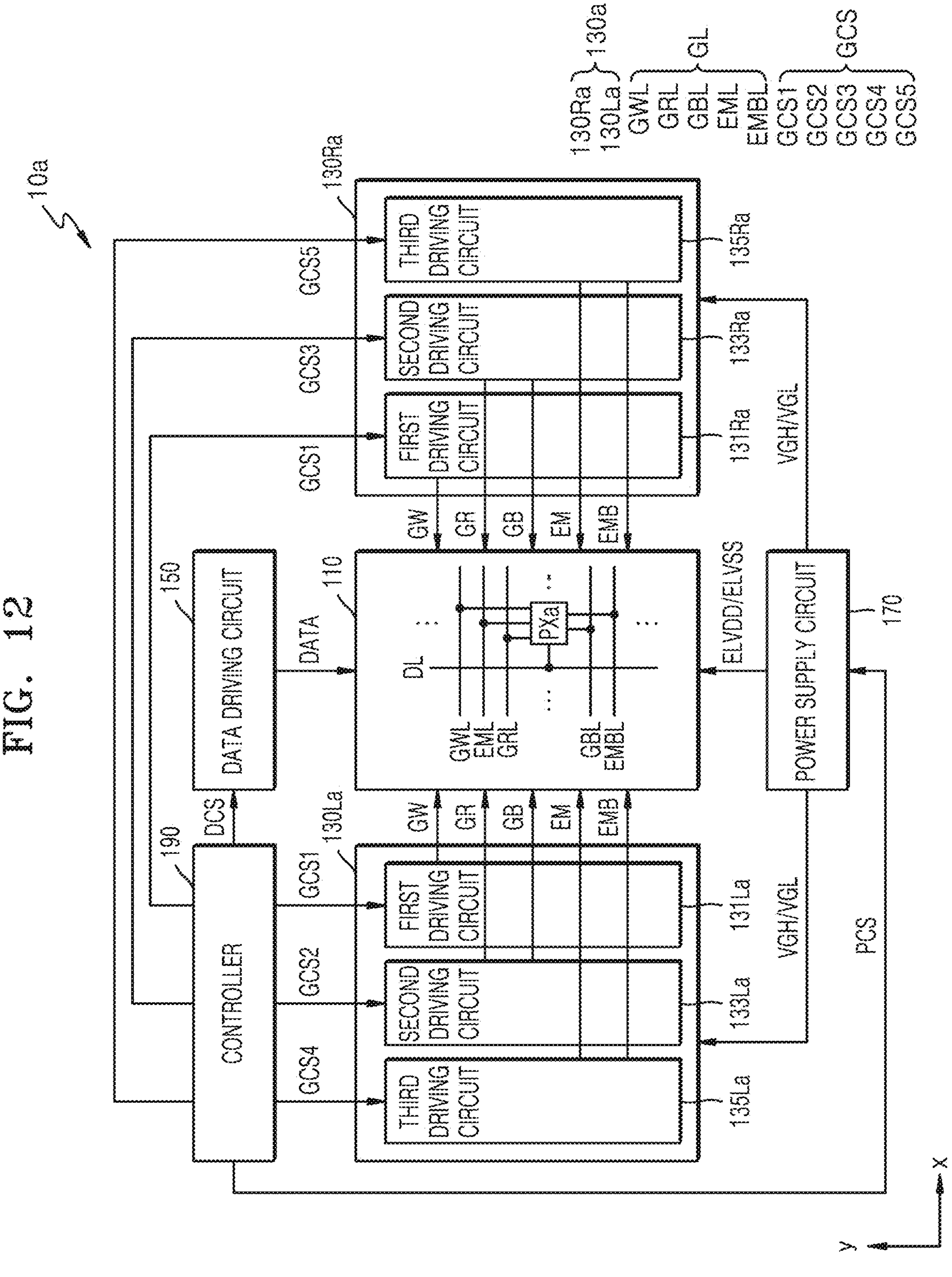
FIG. 12 is a schematic block diagram of a display apparatus according to an embodiment.
Figure 13:
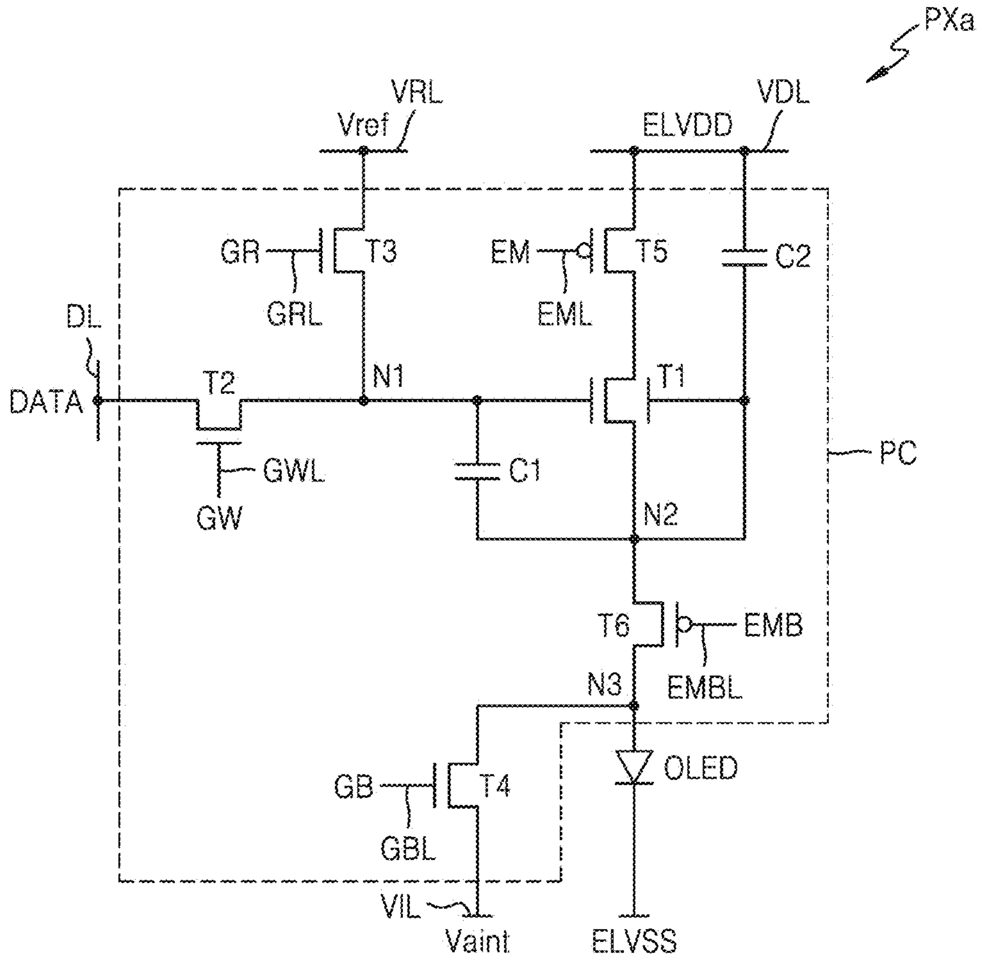
FIG. 13 is a schematic circuit diagram of an equivalent circuit of a pixel according to an embodiment.
Figure 14:
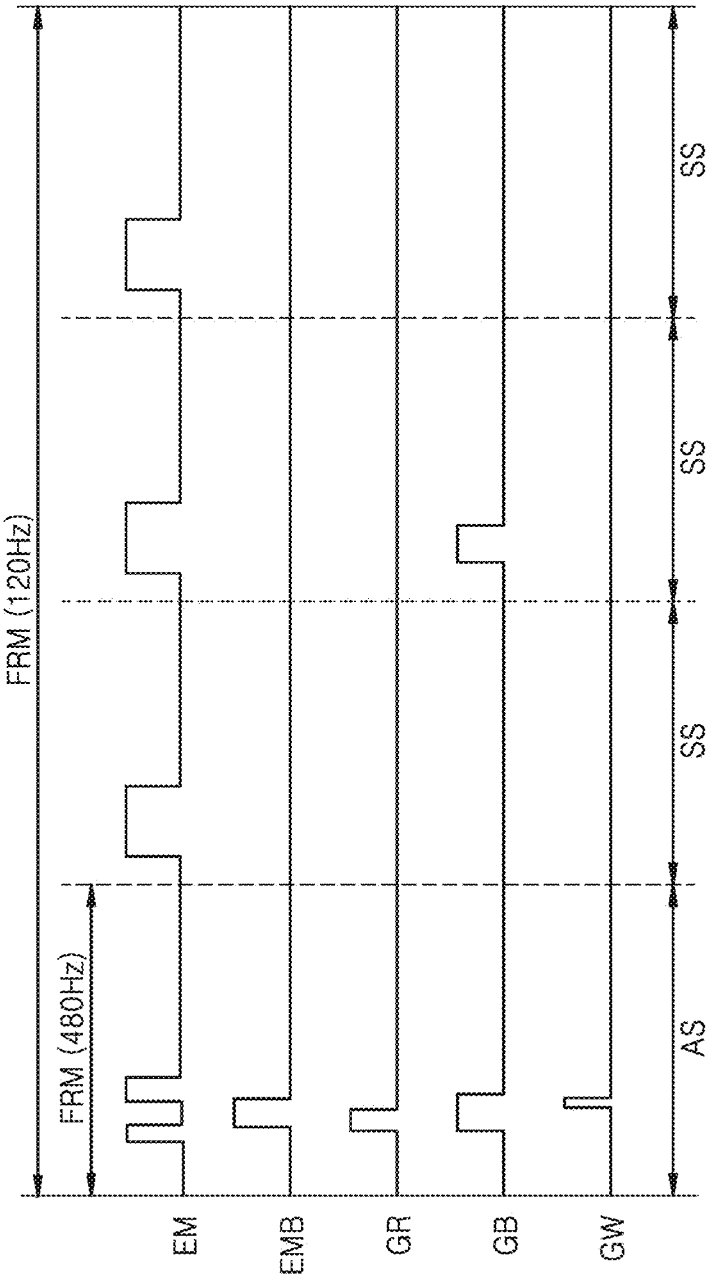
FIG. 14 is a schematic timing diagram of gate signals for driving the pixel illustrated in FIG. 13.

FIG. 12 is a schematic block diagram of a display apparatus 10*a* according to an embodiment. FIG. 13 is a schematic circuit diagram of an equivalent circuit of a pixel PXa according to an embodiment. FIG. 14 is a schematic timing diagram of gate signals for driving the pixel PXa illustrated in FIG. 13.

Referring to FIG. 12, the display apparatus 10*a* according to an embodiment may include a display panel 110, a gate driving circuit 130*a*, a data driving circuit 150, a power supply circuit 170, and a controller 190.

Gate lines GL, data lines DL, and pixels PXa connected thereto may be arranged in a display area of the display panel 110. The pixels PXa may be repeatedly arranged in a first direction (x direction, for example, row direction) and a second direction (y direction, for example, column direction). The pixels PXa may be arranged in any of various configurations, such as a stripe configuration, a PENTILE™ configuration, a diamond configuration, and a mosaic configuration, to display an image. Each of the pixels PXa may include an organic light-emitting diode OLED and a pixel circuit. The pixel circuit may include transistors and at least one capacitor. Each of the pixels PXa may emit, for example, red light, green light, blue light, or white light, via the organic light-emitting diode OLED.

Each of the gate lines GL may extend in the x direction (row direction) and may be connected to pixels PXa arranged in the same row. Each of the gate lines GL may transfer a gate signal to the pixels PXa in the same row. Each of the data lines DL may extend in the y direction (column direction) and may be connected to pixels PXa arranged in the same column. Each of the data lines DL may transfer a data signal DATA to each of the pixels PXa in the same column in synchronization with the gate signal.

The gate driving circuit 130*a* may be connected to the gate lines GL, may generate a gate signal GS according to a gate driving control signal GCS from the controller 190, and may sequentially supply the gate signal GS to the gate lines GL. Each of the gate lines GL may be connected to a gate of a transistor included in each of the pixels PXa, and the gate signal may be a gate control signal that controls turn-on and turn-off operations of the transistor to which the gate line GL is connected. The gate signal may include a gate-on voltage for turning on a transistor and a gate-off voltage for turning off the transistor. The gate driving circuit 130*a* may include an Amorphous Silicon TFT Gate (ASG) driver circuit, a Low Temperature Polycrystaline Silicon (LTPS) TFT gate driver circuit, or an Oxide Semiconductor TFT Gate (OSG) driver circuit embedded in the display panel 110.

The gate driving circuit 130*a* may include a first gate driving circuit 130La arranged on the left side of the display panel 110 and a second gate driving circuit 130Ra arranged on the right side of the display panel 110. The first gate driving circuit 130La may include a first driving circuit 131La, a second driving circuit 133La, and a third driving circuit 135La. The second gate driving circuit 130Ra may include a first driving circuit 131Ra, a second driving circuit 133Ra, and a third driving circuit 135Ra. The first driving circuits 131La and 131Ra may be non-interlaced driver circuits. The second driver circuits 133La and 133Ra and the third driver circuits 135La and 135Ra may be interlaced driver circuits.

The data driving circuit 150 may be connected to the data lines DL, and may supply a data signal DATA to the data lines DL according to a data driving control signal DCS from the controller 190. The data signal DATA supplied to the data line DL may be supplied to pixel PXa to which a gate signal GS has been supplied. The data driving circuit 150 may convert input image data input from the controller 190 and having a gray level into a data signal DATA in the form of voltage or current.

The power supply circuit 170 may generate signals (voltage VGH/VGL and current) desirable for driving the pixels PXa of the display panel 110 in response to a power driving control signal PCS from the controller 190. In case that the display apparatus 10*a* is an organic light-emitting display apparatus, the power supply circuit 170 may generate a first power supply voltage ELVDD and a second power supply voltage ELVSS and supply the same to the pixels PXa. The first power supply voltage ELVDD may be a high-level voltage provided to one terminal of a driving transistor connected to a pixel electrode (a first electrode or an anode) of the organic light-emitting diode of each pixel PXa. The second power supply voltage ELVSS may be a low-level voltage provided to an opposite electrode (a second electrode or a cathode) of the organic light-emitting diode. The first power supply voltage ELVDD and the second power supply voltage ELVSS may be driving voltages for enabling the pixels PXa to emit light.

The power supply circuit 170 may include a power management integrated circuit (PMIC). The PMIC may supply optimized power to each of the components of the display apparatus 10*a*.

The controller 190 may generate the gate driving control signal GCS, the data driving control signal DCS, and the power driving control signal PCS, based on signals received from an external source. The controller 190 may supply the gate driving control signal GCS to the gate driving circuit 130*a*, and may supply the data driving control signal DCS to the data driver circuit 150. According to an embodiment, the gate driving control signal GCS may include clock signals and a start signal. The data driving control signal DCS may include clock signals and a start signal. According to an embodiment, the power supply circuit 170 may generate clock signals and a start signal and supply the same to the gate driving circuit 130*a*.

The display apparatus 10*a* of FIG. 12 independently may include the power supply circuit 170 and the controller 190, but embodiments are not limited thereto. According to an embodiment, the power supply circuit 170 may be included in the controller 190.

Referring to FIG. 12 together with FIG. 13, the pixel PXa may include a pixel circuit PC, and an organic light-emitting diode OLED connected to the pixel circuit PC.

The pixel PXa may be connected to a first gate line GWL that transmits a first gate signal GW, a second gate line GRL that transmits a second gate signal GR, a third gate line GBL that transmits a third gate signal GB, a fourth gate line EML that transmits a fourth gate signal EM, a fifth gate line EMBL that transmits a fifth gate signal EMB, and a data line DL that transmits a data signal DATA. The pixel PXa may also be connected to a driving voltage line VDL that transmits a first power supply voltage ELVDD, a reference voltage line VRL that transmits a reference voltage Vref, and an initializing voltage line VIL that transmits an initializing voltage Vaint.

The pixel circuit PC may include first, second, third, fourth, fifth, and sixth transistors T1, T2, T3, T4, T5, and T6 and first and second capacitors C1 and C2. The first transistor T1 may be a driving transistor that outputs a driving current corresponding to the data signal DATA, and the second through sixth transistors T2 through T6 may be switching transistors that transmit signals. A node to which a gate of the first transistor T1 is connected may be defined as a first node N1, and a node to which a second terminal of the first transistor T1 may be defined as a second node N2. The fifth transistor T5 and the sixth transistor T6 may be P-channel transistors, and the first through fourth transistors T1 through T4 may be N-channel transistors.

The first transistor T1 may be connected between the driving voltage line VDL and the second node N2. The first transistor T1 may include a gate connected to the first node N1, a first terminal connected to a second terminal of the fifth transistor T5, and a second terminal connected to the second node N2. The first transistor T1 may further include a back gate connected to its own second terminal. The gate (first gate) and the back gate (second gate) may be positioned facing each other on different layers with a semiconductor layer arranged between the gate and the back gate. The first transistor T1 may output a driving current corresponding to the data signal DATA.

The second transistor T2 may be connected between the data line DL and the gate of the first transistor T1. The second transistor T2 may include a gate connected to the first gate line GWL, a first terminal connected to the data line DL, and a second terminal connected to the first node N1. The second transistor T2 may be turned on by the first gate signal GW transmitted to the first gate line GWL to electrically connect the data line DL to the first node N1, and may transmit the data signal DATA received via the data line DL to the first node N1.

The third transistor T3 may be connected between the gate of the first transistor T1 and the reference voltage line VRL. The third transistor T3 may include a gate connected to the second gate line GRL, a first terminal connected to the reference voltage line VRL, and a second terminal connected to the gate of the first transistor T1. The third transistor T3 may be turned on by the second gate signal GR received via the second gate line GRL to transmit the reference voltage Vref received via the reference voltage line VRL to the gate of the first transistor T1, thereby initializing the gate of the first transistor T1 with the reference voltage Vref.

The fourth transistor T4 may be connected between the sixth transistor T6 and the initializing voltage line VIL. The fourth transistor T4 may be connected between the organic light-emitting diode OLED and the initializing voltage line VIL. The fourth transistor T4 may include a gate connected to the third gate line GBL, a first terminal connected to a pixel electrode of the organic light-emitting diode OLED, and a second terminal connected to the initializing voltage line VIL. The fourth transistor T4 may be turned on by the third gate signal GB received via the third gate line GBL to transmit the initializing voltage Vaint received via the initializing voltage line VIL to a third node N3, thereby initializing the pixel electrode of the organic light-emitting diode OLED with the initializing voltage Vaint.

The fifth transistor T5 may be connected between the driving voltage line VDL and the first transistor T1. The fifth transistor T5 may include a gate connected to the fourth gate line EML, a first terminal connected to the driving voltage line VDL, and a second terminal connected to the first terminal of the first transistor T1. The fifth transistor T5 may be turned on or off according to the fourth gate signal EM received via the fourth gate line EML.

The sixth transistor T6 may be connected between the first transistor T1 and the organic light-emitting diode OLED. The sixth transistor T6 may be connected between the second node N2 and the third node N3. The sixth transistor T6 may include a gate connected to the fifth gate line EMBL, a first terminal connected to the second node N2, and a second terminal connected to the third node N3. The sixth transistor T6 may be turned on or off according to the fifth gate signal EMB received via the fifth gate line EMBL.

In case that the fifth transistor T5 and the sixth transistor T6 are turned on simultaneously, the first transistor T1 may output a driving current, and the organic light-emitting diode OLED may emit light.

A first capacitor C1 may be connected between the gate of the first transistor T1 and the second terminal of the first transistor T1. The first capacitor C1, which is a storage capacitor, may store a voltage corresponding to a threshold voltage of the first transistor T1 and the data signal DATA.

A second capacitor C2 may be connected between the driving voltage line VDL and the second terminal of the first transistor T1. The second capacitor C2 may maintain a voltage of the first capacitor C1 in case that driving at a low frequency. A capacitance of the first capacitor C1 may be greater than that of the second capacitor C2.

The organic light-emitting diode OLED may include the pixel electrode (anode) connected to the third node N3 and an opposite electrode (cathode) facing the pixel electrode, and the opposite electrode may receive the second power supply voltage ELVSS. The opposite electrode may be a common electrode that is common to pixels PXa.

Referring back to FIG. 12, first driving circuits 131La and 131Ra on the left side and the right side may be connected to first gate lines GWL, and may sequentially output a first gate signal GW to first gate lines GWL according to a first control signal GCS1.

A second driving circuit 133La on the left side and a second driving circuit 133Ra on the right side may be connected to second gate lines GRL, and may sequentially output a second gate signal GR to second gate lines GRL alternately according to a second control signal GCS2 and a third control signal GCS3. The second driving circuit 133La on the left side and the second driving circuit 133Ra on the right side may be connected to third gate lines GBL, and may sequentially output a third gate signal GB to third gate lines GBL alternately according to the second control signal GCS2 and the third control signal GCS3.

A third driving circuit 135La on the left side and a third driving circuit 135Ra on the right side may be connected to fourth gate lines EML, and may sequentially output a fourth gate signal EM to fourth gate lines EML alternately according to a fourth control signal GCS4 and a fifth control signal GCS5. The third driving circuit 135La on the left side and the third driving circuit 135Ra on the right side may be connected to fifth gate lines EMBL, and may sequentially output a fifth gate signal EMB to fifth gate lines EMBL alternately according to the fourth control signal GCS4 and the fifth control signal GCS5.

As illustrated in FIG. 14, in case that driving at a high frequency (for example, about 480 Hz), the gate driving circuit 130*a* may output the first, second, third, fourth, and fifth gate signals GW, GR, GB, EM, and EMB to a pixel PXa at the timing of an address scan period AS for each frame FRM. In case that driving at a lower frequency than the high frequency, the gate driving circuit 130*a* may output the first, second, third, fourth, and fifth gate signals GW, GR, GB, EM, and EMB to the pixel PXa at the timing of the address scan period AS and at least one self-scan period SS for each frame FRM. The third gate signal GB may be periodically input to the pixel PXa during a self-scan period SS. For example, during driving at 120 Hz, one frame FRM may include an address scan period AS and three self-scan periods SS. During driving at 120 Hz, the fourth gate signal EM may be input to the pixel PXa in 4 cycles during one frame FRM, the third gate signal GB may be input to the pixel PXa in 2 cycles, and the first gate signal GW, the second gate signal GR, and the fifth gate signal EMB may be input to the pixel PXa in 1 cycle.

Figure 15:
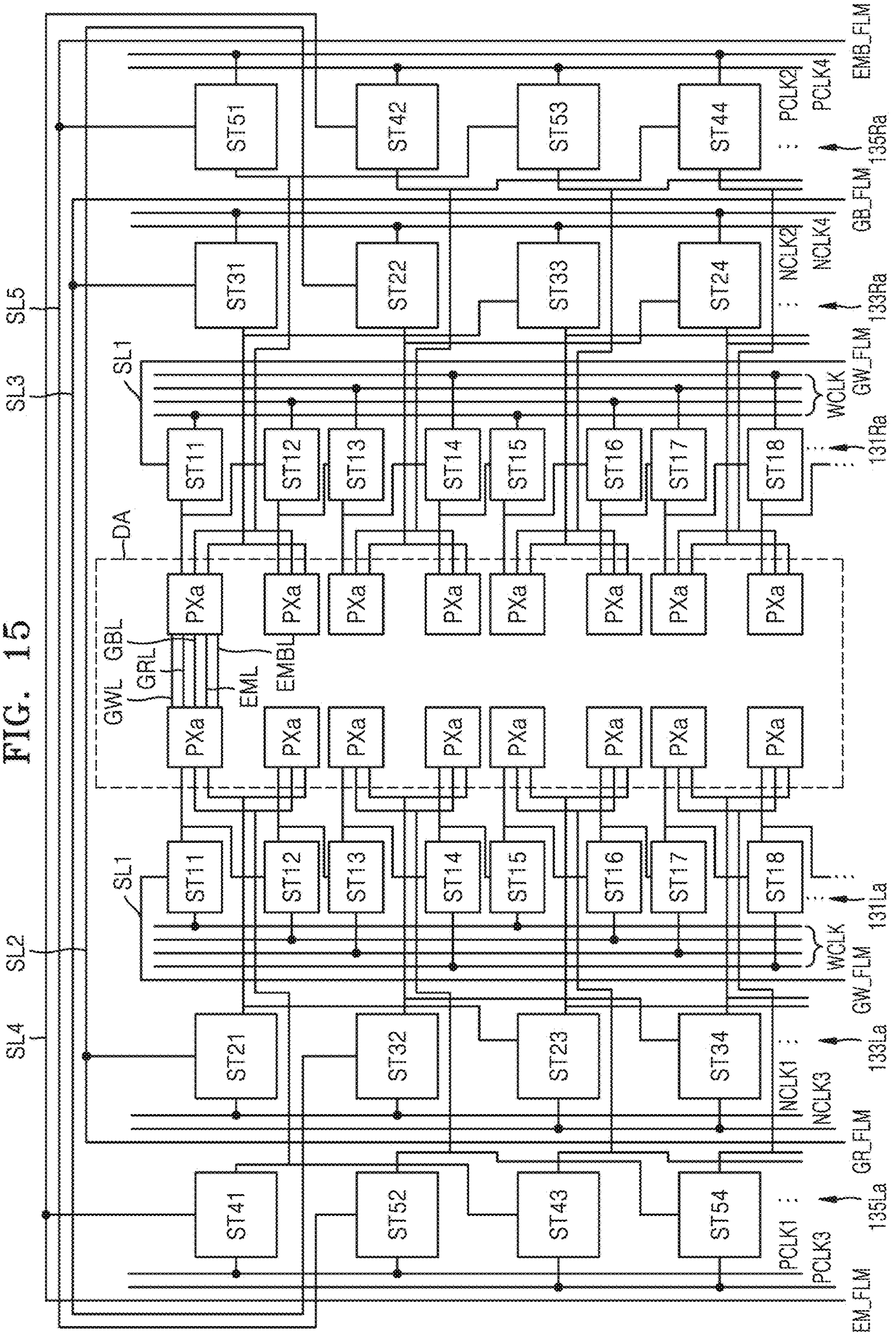
FIG. 15 is a schematic diagram of a gate driver circuit of FIG. 12, according to an embodiment.
Figure 16:
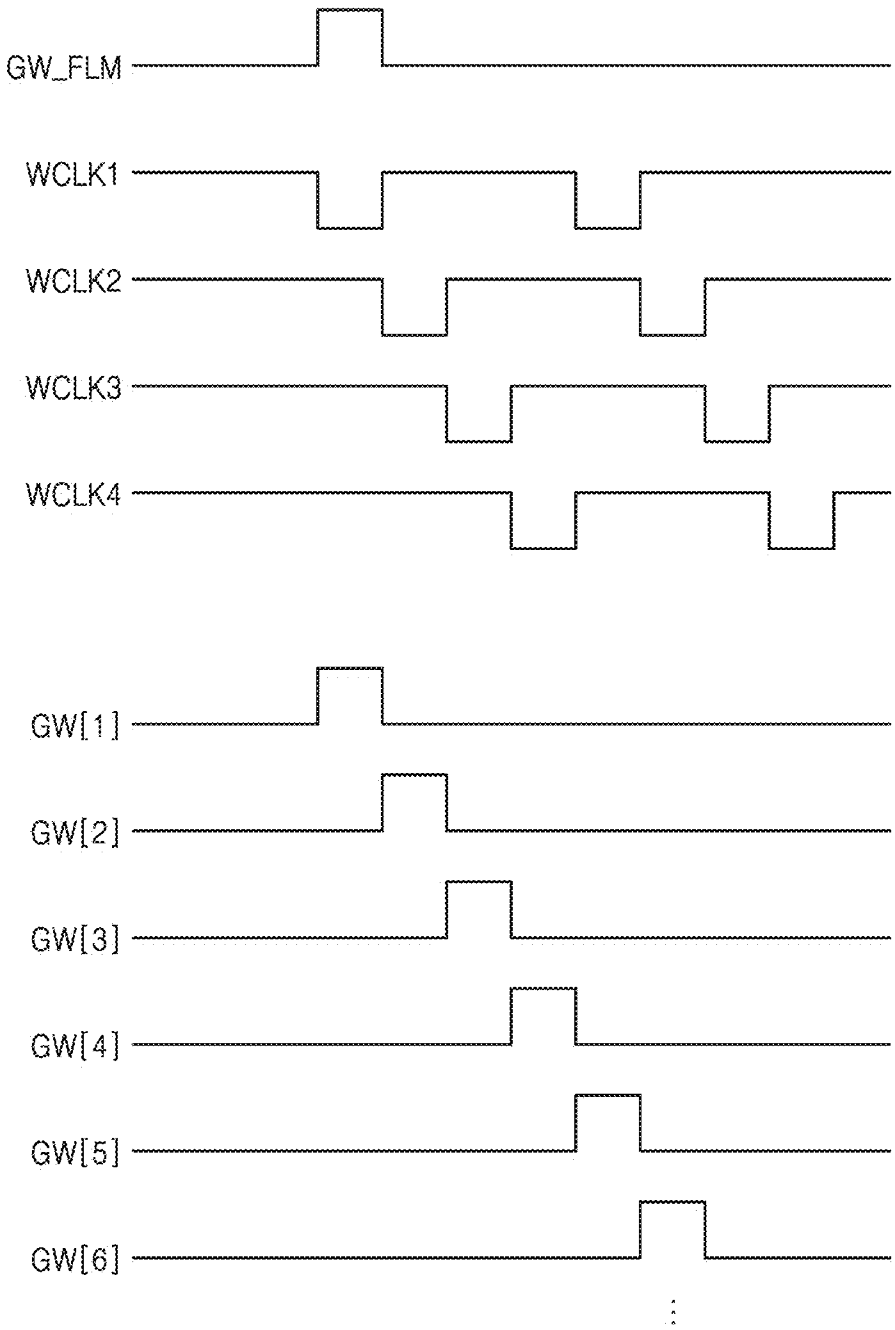
FIGS. 16 through 18 are schematic diagrams illustrating input signals and output signals of the gate driver circuit of FIG. 15.
Figure 17:
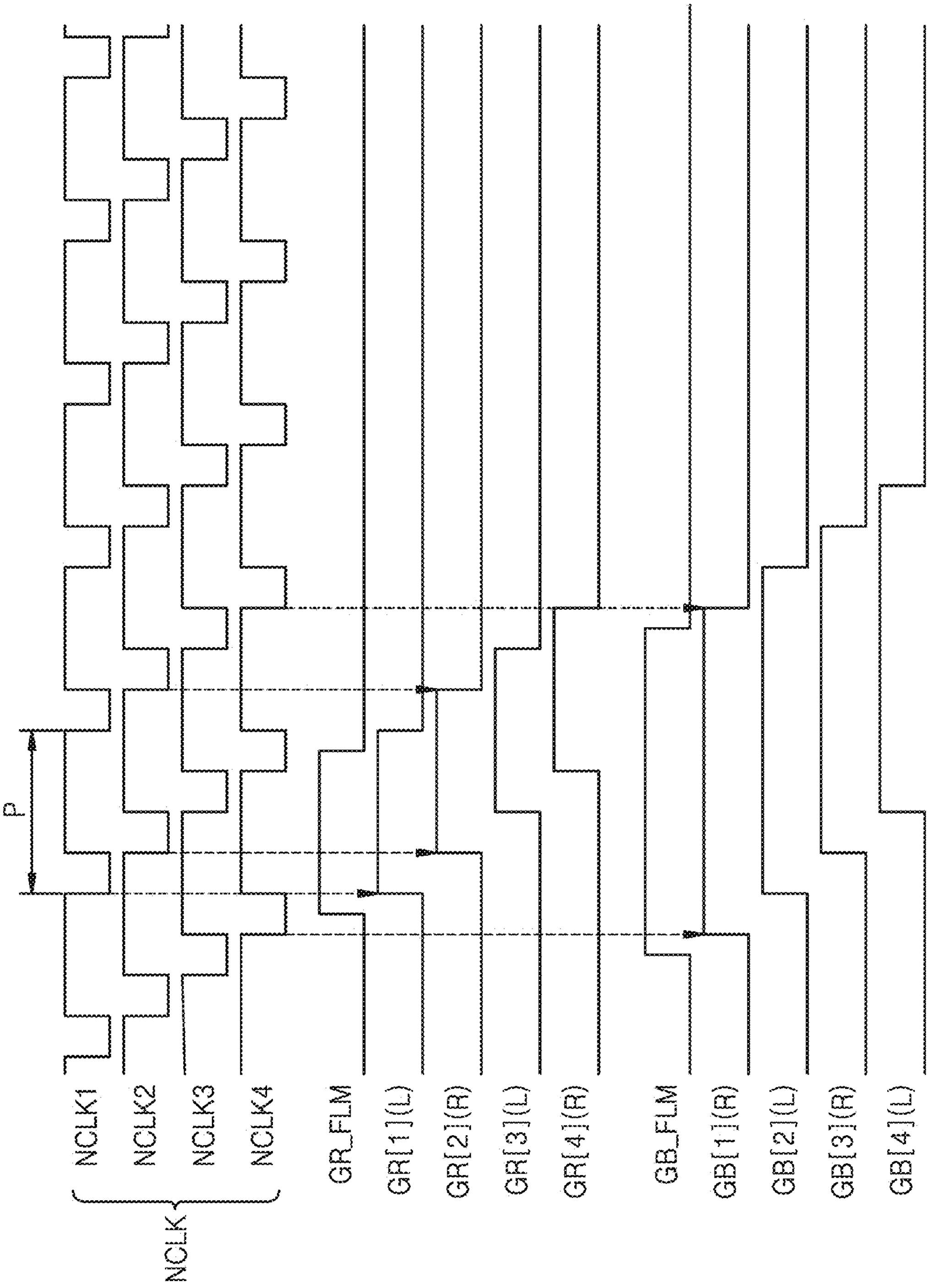
Figure 18:
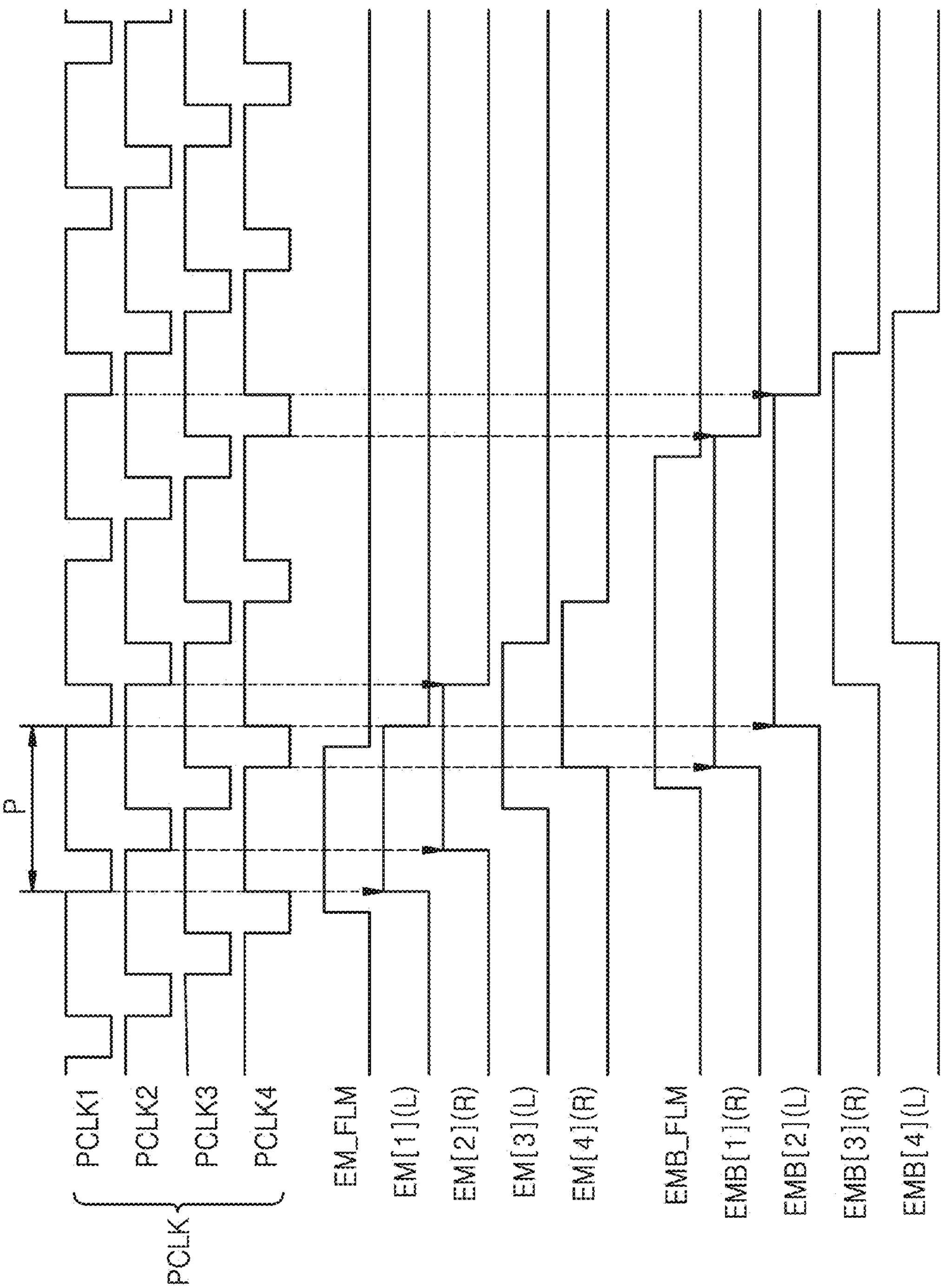

FIG. 15 is a schematic diagram of the gate driving circuit 130*a* of FIG. 12 according to an embodiment. FIGS. 16 through 18 are schematic diagrams illustrating input signals and output signals of the gate driver circuit. A description of FIGS. 15 through 18 that is the same as described above with reference to FIGS. 5 through 11 will not be repeated herein.

Referring to FIG. 15, the first driving circuit 131La on the left side and the first driving circuit 131Ra on the right side may be symmetrical with each other with the display area DA arranged between the first driving circuit 131La on the left side and the first driving circuit 131Ra on the right side. Each of the first driver circuit 131La on the left side and the right first driver circuit 131Ra on the right side may include first stages ST11, ST12, ST13, ST14, ST15, ST16, ST17, ST18, . . . .

Each of the first stages ST11, ST12, ST13, ST14, ST15, ST16, ST17, ST18, . . . , may correspond to each row of the display panel 110.

A clock terminal of each of the first stages ST11, ST12, ST13, ST14, ST15, ST16, ST17, ST18, . . . , of each of the first driver circuit 131La on the left side and the first driver circuit 131Ra on the right side may be connected to a clock line to which a clock signal WCLK is input, and an output terminal thereof may be connected to the first gate line GWL. As illustrated in FIG. 16, the clock signal WCLK may include first, second, third, and fourth clock signals WCLK1, WCLK2, WCLK3, and WCLK4.

A first start signal line SL1 may be connected to an input terminal of a first first stage ST11 among the first stages ST11, ST12, ST13, ST14, ST15, ST16, ST17, ST18, . . . .

A first start signal GW_FLM may be input through the first start signal line SL1. A first gate signal GW of a previous first stage may be input to an input terminal of each of the second and subsequent first stages ST12, ST13, ST14, ST15, ST16, ST17, ST18, . . . among the first stages ST11, ST12, ST13, ST14, ST15, ST16, ST17, ST18, . . . . For example, a first gate signal GW [1] output by the first first stage ST11 may be input to an input terminal of the second first stage ST12, and a first gate signal GW [2] output by the second first stage ST12 may be input to an input terminal of the third first stage ST13.

The first stages ST11, ST12, ST13, ST14, ST15, ST16, ST17, ST18, . . . , of each of the first driver circuit 131La on the left side and the first driver circuit 131Ra on the right side may sequentially output high-level first gate signals GW [1], GW [2], GW [3], GW [4], GW [5], GW [6], . . . , in correspondence with the first, second, third, and fourth clock signals WCLK1, WCLK2, WCLK3, and WCLK4 according to the first start signal GW_FLM.

The second driver circuit 133La on the left side may include odd-numbered second stages ST21, ST23, . . . , among second stages ST21, ST22, ST23, ST24, . . . , and the second driver circuit 133Ra on the right side may include even-numbered second stages ST22, ST24, . . . , among the second stages ST21, ST22, ST23, ST24, . . . .

The second driver circuit 133Ra on the right side may include odd-numbered third stages ST31, ST33, . . . , among third stages ST31, ST32, ST33, ST34, . . . , and the second driver circuit 133La on the left side may include even-numbered third stages ST32, ST34, . . . , among the third stages ST31, ST32, ST33, ST34, . . . .

The odd-numbered second stages ST21, ST23, . . . , and the even-numbered third stages ST32, ST34, . . . , may alternate with each other. The odd-numbered third stages ST31, ST33, . . . , and the even-numbered second stages ST22, ST24, . . . , may alternate with each other.

Each of the second stages ST21, ST22, ST23, ST24, . . . , and each of the third stages ST31, ST32, ST33, ST34, . . . , may correspond to two adjacent rows (a pair of adjacent rows).

The second driver circuit 133La on the left side and the second driver circuit 133Ra on the right side may be connected to a clock line to which a second gate clock signal NCLK is input. As illustrated in FIG. 17, the second gate clock signal NCLK may include first, second, third, and fourth clock signals NCLK1, NCLK2, NCLK3, and NCLK4. According to an embodiment, the first clock signal NCLK1 and the third clock signal NCLK3 may be input to the second driver circuit 133La on the left side, and the second clock signal NCLK2 and the fourth clock signal NCLK4 may be input to the second driver circuit 133Ra on the right side.

The first clock signal NCLK1 and the third clock signal NCLK3 may be alternately input to the clock terminals of the odd-numbered second stages ST21, ST23, . . . , of the second driver circuit 133La on the left side. The first clock signal NCLK1 and the third clock signal NCLK3 may be alternately input to the clock terminals of the even-numbered third stages ST32, ST34, . . . , of the second driver circuit 133La on the left side. For example, the first clock signal NCLK1 may be input to the clock terminals of the first second stage ST21 and the second third stage ST32, and the third clock signal NCLK3 may be input to the clock terminals of the third second stage ST23 and the fourth third stage ST34.

The second clock signal NCLK2 and the fourth clock signal NCLK4 may be alternately input to the clock terminals of the odd-numbered third stages ST31, ST33, . . . , of the second driver circuit 133Ra on the right side. The second clock signal NCLK2 and the fourth clock signal NCLK4 may be alternately input to the clock terminals of the even-numbered second stages ST22, ST24, . . . , of the second driver circuit 133Ra on the right side. For example, the fourth clock signal NCLK4 may be input to the clock terminals of the first third stage ST31 and the fourth second stage ST24, and the second clock signal NCLK2 may be input to the clock terminals of the second second stage ST22 and the third third stage ST33.

The first second stage ST21 arranged on the left side and the second second stage ST22 arranged on the right side may share a second start signal line SL2. The second start signal line SL2 may be connected to the input terminal of each of the first second stage ST21 of the second driver circuit 133La on the left side and the second second stage ST22 of the second driver circuit 133Ra on the right side, and a second start signal GR_FLM may be input through the second start signal line SL2.

The second gate signal GR output by an odd-numbered previous second stage may be input to respective input terminals of the second stages ST23, . . . , arranged at second and its subsequent positions among the odd-numbered second stages ST21, ST23, . . . . The second gate signal GR output by an even-numbered previous second stage may be input to respective input terminals of the second stages ST24, . . . , arranged at second and its subsequent positions among the even-numbered second stages ST22, ST24, . . . . For example, a second gate signal GR[1] output by the first second stage ST21 may be input to an input terminal of the third second stage ST23, and a second gate signal GR[2] output by the second second stage ST22 may be input to an input terminal of the fourth second stage ST24.

The second stages ST21, ST22, ST23, ST24, . . . , may generate high-level second gate signals GR[1], GR[2], GR[3], GR[4], . . . , in such a way that a second stage on the left side and a second stage on the right side alternately generate high-level second gate signals in correspondence with the order of the first clock signal NCLK1, the second clock signal NCLK2, the third clock signal NCLK3, and the fourth clock signal NCLK4 according to the second start signal GR_FLM, and may sequentially output the generated high-level second gate signals GR[1], GR[2], GR[3], GR[4], . . . to the second gate lines GRL.

The first third stage ST31 arranged on the right side and the second third stage ST32 arranged on the left side may share a third start signal line SL3. The third start signal line SL3 may be connected to the input terminal of each of the first third stage ST31 of the second driver circuit 133Ra on the right side and the second third stage ST32 of the second driver circuit 133La on the left side, and a third start signal GB_FLM may be input through the third start signal line SL3.

The third gate signal GB output by an odd-numbered previous third stage may be input to respective input terminals of the third stages ST33, . . . , arranged at second and its subsequent positions among the odd-numbered third stages ST31, ST33, . . . . The third gate signal GB output by an even-numbered previous third stage may be input to respective input terminals of the third stages ST34, . . . , arranged at second and its subsequent positions among the even-numbered third stages ST32, ST34, . . . . For example, a third gate signal GB [1] output by the first third stage ST31 may be input to an input terminal of the third third stage ST33, and a third gate signal GB [2] output by the second third stage ST32 may be input to an input terminal of the fourth third stage ST34.

The third stages ST31, ST32, ST33, ST34, . . . , may generate high-level third gate signals GB [1], GB [2], GB [3], GB [4], . . . , in such a way that a third stage on the right side and a third stage on the left side alternately generate high-level third gate signals in correspondence with the order of the fourth clock signal NCLK4, the first clock signal NCLK1, the second clock signal NCLK2, and the third clock signal NCLK3 according to the third start signal GB_FLM, and may sequentially output the generated high-level third gate signals GB [1], GB [2], GB [3], GB [4], . . . to the third gate lines GBL.

The third driver circuit 135La on the left side may include odd-numbered fourth stages ST41, ST43, . . . , among fourth stages ST41, ST42, ST43, ST44, . . . , and the third driver circuit 135Ra on the right side may include even-numbered fourth stages ST42, ST44, . . . , among the fourth stages ST41, ST42, ST43, ST44, . . . .

The third driver circuit 135Ra on the right side may include odd-numbered fifth stages ST51, ST53, . . . , among fifth stages ST51, ST52, ST53, ST54, . . . , and the third driver circuit 135La on the left side may include even-numbered fifth stages ST52, ST54, . . . , among the fifth stages ST51, ST52, ST53, ST54, . . . .

The odd-numbered fourth stages ST41, ST43, . . . , and the even-numbered fifth stages ST52, ST54, . . . , may alternate with each other. The odd-numbered fifth stages ST51, ST53, . . . , and the even-numbered fourth stages ST42, ST44, . . . , may alternate with each other.

Each of the fourth stages ST41, ST42, ST43, ST44, . . . , and each of the fifth stages ST51, ST52, ST53, ST54, . . . , may correspond to two adjacent rows (a pair of adjacent rows).

The third driver circuit 135La on the left side and the third driver circuit 135Ra on the right side may be connected to a clock line to which a third gate clock signal PCLK is input. As illustrated in FIG. 18, the third gate clock signal PCLK may include first, second, third, and fourth clock signals PCLK1, PCLK2, PCLK3, and PCLK4. According to an embodiment, the first clock signal PCLK1 and the third clock signal PCLK3 may be input to the third driver circuit 135La on the left side, and the second clock signal PCLK2 and the fourth clock signal PCLK4 may be input to the third driver circuit 135Ra on the right side.

The first clock signal PCLK1 and the third clock signal PCLK3 may be alternately input to the clock terminals of the odd-numbered fourth stages ST41, ST43, . . . , of the third driver circuit 135La on the left side. The first clock signal PCLK1 and the third clock signal PCLK3 may be alternately input to the clock terminals of the even-numbered fifth stages ST52, ST54, . . . , of the third driver circuit 135La on the left side. For example, the first clock signal PCLK1 may be input to the clock terminals of the first fourth stage ST41 and the second fifth stage ST52, and the third clock signal PCLK3 may be input to the clock terminals of the third fourth stage ST43 and the fourth fifth stage ST54.

The second clock signal PCLK2 and the fourth clock signal PCLK4 may be alternately input to the clock terminals of the odd-numbered fifth stages ST51, ST53, . . . , of the third driver circuit 135Ra on the right side. The second clock signal PCLK2 and the fourth clock signal PCLK4 may be alternately input to the clock terminals of the even-numbered fourth stages ST42, ST44, . . . , of the third driver circuit 135Ra on the right side. For example, the fourth clock signal PCLK4 may be input to the clock terminals of the first fifth stage ST51 and the fourth fourth stage ST44, and the second clock signal PCLK2 may be input to the clock terminals of the second fourth stage ST42 and the third fifth stage ST53.

The first fourth stage ST41 arranged on the left side and the second fourth stage ST42 arranged on the right side may share a fourth start signal line SL4. The fourth start signal line SL4 may be connected to the input terminal of each of the first fourth stage ST41 of the third driver circuit 135La on the left side and the second fourth stage ST42 of the third driver circuit 135Ra on the right side, and a fourth start signal EM_FLM may be input through the fourth start signal line SL4.

A fourth gate signal EM output by an odd-numbered previous fourth stage may be input to the input terminal of each of fourth stages ST43, . . . , arranged at second and its subsequent positions among the odd-numbered fourth stages ST41, ST43, . . . . A fourth gate signal EM output by an even-numbered previous fourth stage may be input to the input terminal of each of fourth stages ST44, . . . , arranged at second and its subsequent positions among the even-numbered fourth stages ST42, ST44, . . . . For example, a fourth gate signal EM[1] output by the first fourth stage ST41 may be input to an input terminal of the third fourth stage ST43, and a fourth gate signal EM[2] output by the second fourth stage ST42 may be input to an input terminal of the fourth fourth stage ST44.

The fourth stages ST41, ST42, ST43, ST44, . . . , may generate high-level fourth gate signals EM[1], EM[2], EM[3], EM[4], . . . , in such a way that a fourth stage on the left side and a fourth stage on the right side alternately generate high-level fourth gate signals in correspondence with the order of the first clock signal PCLK1, the second clock signal PCLK2, the third clock signal PCLK3, and the fourth clock signal PCLK4 according to the fourth start signal EM_FLM, and may sequentially output the generated high-level fourth gate signals EM[1], EM[2], EM[3], EM[4], . . . to the fourth gate lines EML.

The first fifth stage ST51 arranged on the right side and the second fifth stage ST52 arranged in the left side may share a fifth start signal line SL5. The fifth start signal line SL5 may be connected to the input terminal of each of the first fifth stage ST51 of the third driver circuit 135Ra on the right side and the second fifth stage ST52 of the third driver circuit 135La on the left side, and a fifth start signal EMB_FLM may be input through the fifth start signal line SL5.

A fifth gate signal EMB output by an odd-numbered previous fifth stage may be input to the input terminal of each of fifth stages ST53, . . . , arranged at second and its subsequent positions among the odd-numbered fifth stages ST51, ST53, . . . . A fifth gate signal EMB output by an even-numbered previous fifth stage may be input to the input terminal of each of fifth stages ST54, . . . , arranged at second and its subsequent positions among the even-numbered fifth stages ST52, ST54, . . . . For example, a fifth gate signal EMB[1] output by the first fifth stage ST51 may be input to an input terminal of the third fifth stage ST53, and a fifth gate signal EMB[2] output by the second fifth stage ST52 may be input to an input terminal of the fourth fifth stage ST54.

The fifth stages ST51, ST52, ST53, ST54, . . . , may generate high-level fifth gate signals EMB[1], EMB[2], EMB[3], EMB[4], . . . , in such a way that a fifth stage on the right side and a fifth stage on the left side alternately generate high-level fifth gate signals in correspondence with the order of the fourth clock signal PCLK4, the first clock signal PCLK1, the second clock signal PCLK2, and the third clock signal PCLK3 according to the fifth start signal EMB_FLM, and may sequentially output the generated high-level fifth gate signals EMB[1], EMB[2], EMB[3], EMB[4], . . . to the fifth gate lines EMBL.

Embodiments are not limited to the pixel PXa illustrated in FIG. 13.

Figure 19:
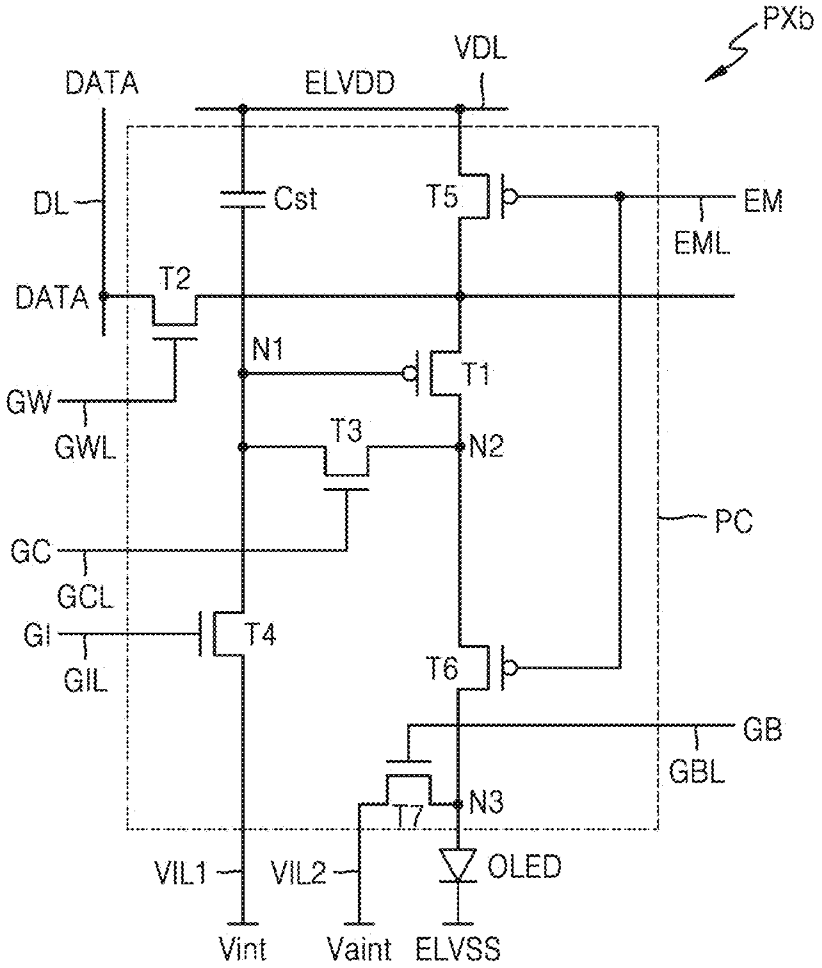
FIG. 19 is a schematic circuit diagram of an equivalent circuit of a pixel according to an embodiment.
Figure 20:
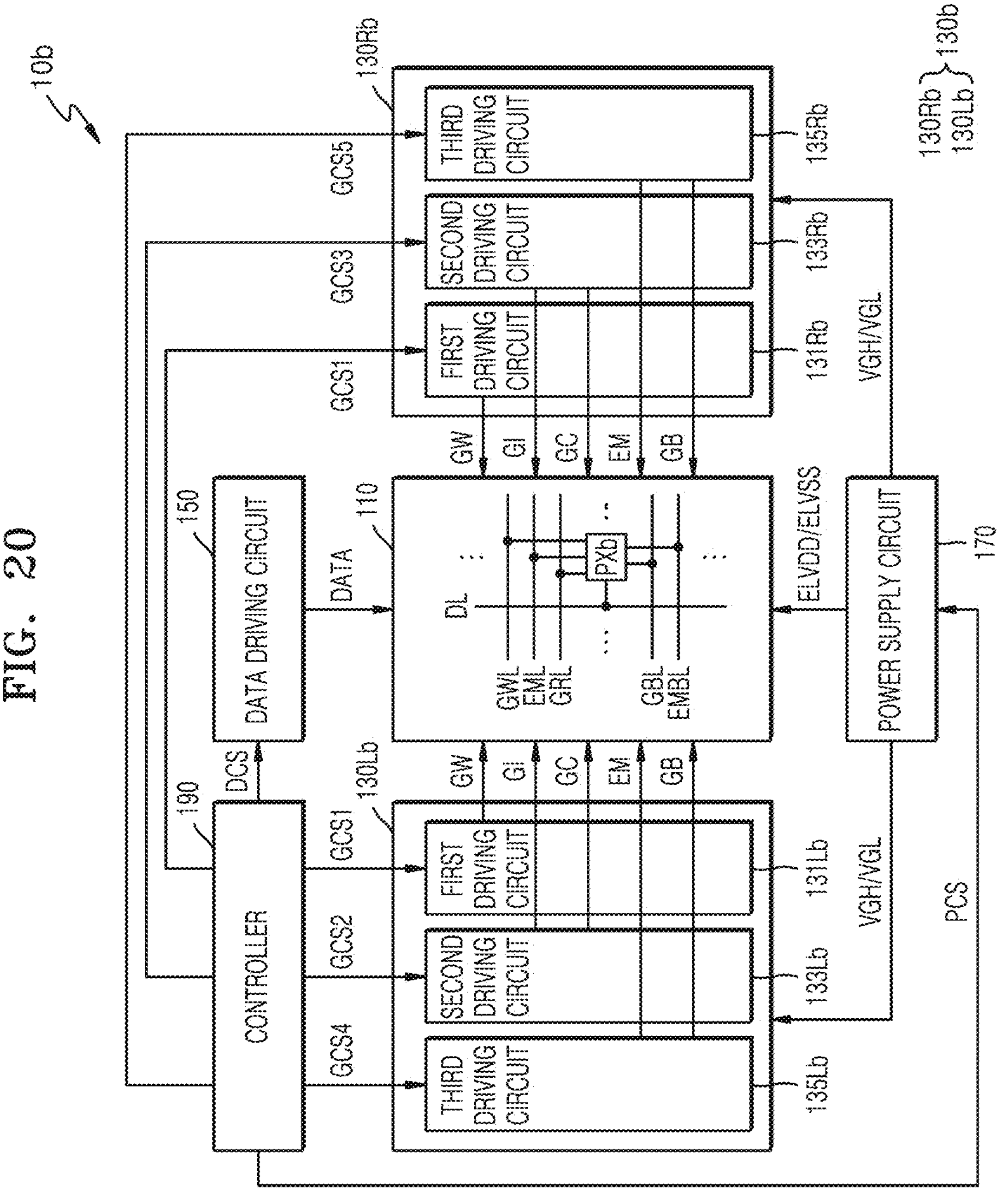
FIG. 20 is a schematic diagram of a display apparatus including the pixel of FIG. 19, according to an embodiment.
Figure 21:
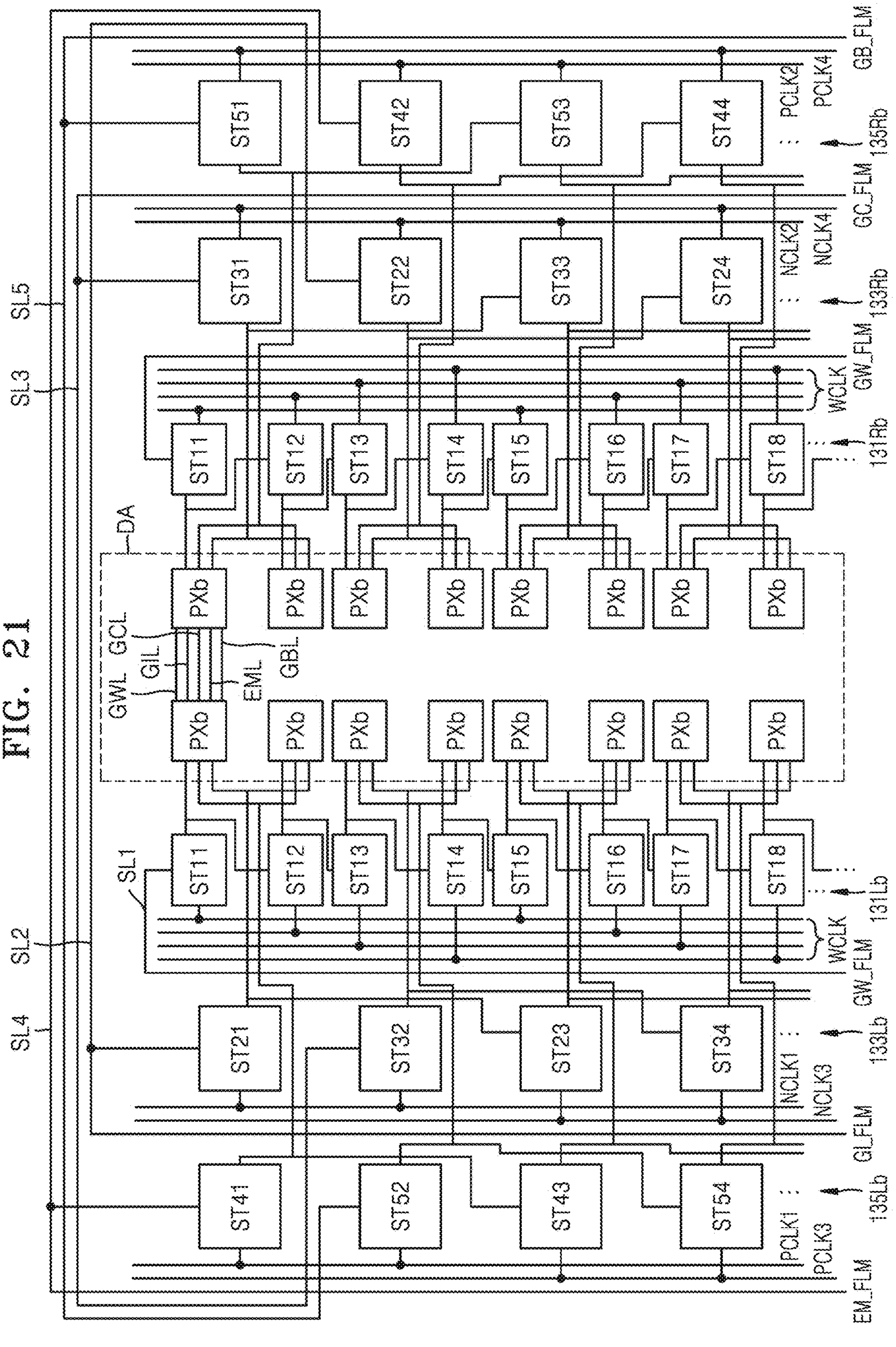
FIG. 21 is a schematic diagram of a gate driver circuit of FIG. 20, according to an embodiment.

FIG. 19 is a schematic circuit diagram of an equivalent circuit of a pixel PXb according to an embodiment. FIG. 20 is a schematic diagram of a display apparatus 10*b* including the pixel PXb of FIG. 19, according to an embodiment. FIG. 21 is a schematic diagram of a gate driving circuit 130*b* of FIG. 20 according to an embodiment.

Referring to FIG. 19, the pixel PXb may include a pixel circuit PC, and an organic light-emitting diode OLED connected to the pixel circuit PC. The pixel circuit PC may include transistors T1 through T7, namely, first, second, third, fourth, fifth, sixth, and seventh transistors T1, T2, T3, T4, T5, T6, and T7, and a capacitor Cst. Each of the pixels PXb may be connected to a first gate line GWL that transmits a first gate signal GW, a second gate line GIL that transmits a second gate signal GI, a third gate line GCL that transmits a third gate signal GC, a fourth gate line EML that transmits a fourth gate signal EM, a fifth gate line GBL that transmits a fifth gate signal GB, and a data line DL that transmits a data signal DATA. The pixel PXb may also be connected to a driving voltage line VDL that transmits a first power supply voltage ELVDD, a first initializing voltage line VIL1 that transmits a first initializing voltage Vint, and a second initializing voltage line VIL2 that transmits a second initializing voltage Vaint. The first transistors T1, the fifth transistor T5, and the sixth transistor T6 may be P-channel transistors, and the second through fourth transistors T2 through T4 and the seventh transistor T7 may be N-channel transistors.

The first transistor T1 may be connected between the driving voltage line VDL and the organic light-emitting diode OLED. The first transistor T1 may include a gate connected to a second node N2, a first terminal connected to a first node N1, and a second terminal connected to a third node N3. The first transistor T1 may output a driving current corresponding to the data signal DATA.

The second transistor T2 may be connected between the data line DL and the first terminal of the first transistor T1. The second transistor T2 may include a gate connected to the first gate line GWL, a first terminal connected to the data line DL, and a second terminal connected to the second node N2. The second transistor T2 may be turned on in response to the first gate signal GW received through the first gate line GWL, and thus may transmit the data signal DATA received through the data line DL to the second node N2.

The third transistor T3 may be connected between the gate of the first transistor T1 and the second terminal of the first transistor T1. The third transistor T3 may include a gate connected to the third gate line GCL, a first terminal connected to the third node N3, and a second terminal connected to the first node N1. The third transistor T3 may be turned on in response to the third gate signal GC received through the third gate line GCL to diode-connect the first transistor T1, thereby compensating for a threshold voltage of the first transistor T1.

The fourth transistor T4 may be connected between the gate of the first transistor T1 and the first initializing voltage line VIL1. The fourth transistor T4 may include a gate connected to the second gate line GIL, a first terminal connected to the first node N1, and a second terminal connected to the first initializing voltage line VIL1. The fourth transistor T4 may be turned on in response to the second gate signal GI received through the second gate line GIL, to transmit the first initializing voltage Vint to the gate of the first transistor T1 to thereby initialize the gate voltage of the first transistor T1.

The fifth transistor T5 may be connected between the driving voltage line VDL and the second node N2. The sixth transistor T6 may be connected between the third node N3 and the organic light-emitting diode OLED. The fifth transistor T5 may include a gate connected to the fourth gate line EML, a first terminal connected to the driving voltage line VDL, and a second terminal connected to the second node N2. The sixth transistor T6 may include a gate connected to the fourth gate line EML, a first terminal connected to the third node N3, and a second terminal connected to a pixel electrode of the organic light-emitting diode OLED. The fifth transistor T5 and the sixth transistor T6 may be simultaneously turned on according to the fourth gate signal EM received via the fourth gate line EML, and thus the first transistor T1 may output the driving current and the organic light-emitting diode OLED may emit light.

The seventh transistor T7 may be connected between the organic light-emitting diode OLED and the second initializing voltage line VIL2. The seventh transistor T7 may include a gate connected to the fifth gate line GBL, a first terminal connected to the pixel electrode of the organic light-emitting diode OLED, and a second terminal connected to the second initializing voltage line VIL2. The seventh transistor T7 may be turned on in response to the fifth gate signal GB received via the fifth gate line GBL to transmit the second initializing voltage Vaint to the pixel electrode of the organic light-emitting diode OLED and initialize a voltage of the pixel electrode of the organic light-emitting diode OLED.

The capacitor Cst may be connected between the driving voltage line VDL and the gate of the first transistor T1. The capacitor Cst, which is a storage capacitor, may store a voltage corresponding to a threshold voltage of the first transistor T1 and the data signal DATA.

The organic light-emitting diode OLED may include a pixel electrode and an opposite electrode, and the opposite electrode may receive a second power supply voltage ELVSS.

Referring to FIG. 20, the display apparatus 10*b* may include a display panel 110, a gate driving circuit 130*b*, a data driving circuit 150, a power supply circuit 170, and a controller 190. A description of FIGS. 19 through 21 that is the same as described above with reference to FIGS. 15 through 18 will not be repeated herein.

The gate driving circuit 130*b* may include a first gate driving circuit 130Lb arranged on the left side of the display panel 110 and a second gate driving circuit 130Rb arranged on the right side of the display panel 110. The first gate driving circuit 130Lb may include a first driving circuit 131Lb, a second driving circuit 133Lb, and a third driving circuit 135Lb. The second gate driving circuit 130Rb may include a first driving circuit 131Rb, a second driving circuit 133Rb, and a third driving circuit 135Rb. The first driving circuits 131Lb and 131Rb may be non-interlaced driver circuits. The second driver circuits 133Lb and 133Rb and the third driver circuits 135Lb and 135Rb may be interlaced driver circuits.

Referring to FIG. 21, the first driving circuit 131Lb on the left side and the first driving circuit 131Rb on the right side may be symmetrical with each other with the display area DA arranged between the first driving circuit 131Lb on the left side and the first driving circuit 131Rb on the right side. Each of the first driving circuit 131Lb on the left side and the right first driving circuit 131Rb on the right side may include first stages ST11, ST12, ST13, ST14, ST15, ST16, ST17, ST18, . . . .

The second driver circuit 133Lb on the left side may include odd-numbered second stages ST21, ST23, . . . , and even-numbered third stages ST32, ST34, . . . , that alternate with each other. The first clock signal NCLK1 and the third clock signal NCLK3 may be alternately input to the clock terminals of the odd-numbered second stages ST21, ST23, . . . . The first clock signal NCLK1 and the third clock signal NCLK3 may be alternately input to the clock terminals of the even-numbered third stages ST32, ST34, . . . .

The second driver circuit 133Rb on the right side may include odd-numbered third stages ST31, ST33, . . . , and even-numbered second stages ST22, ST24, . . . , that alternate with each other. The second clock signal NCLK2 and the fourth clock signal NCLK4 may be alternately input to the clock terminals of the odd-numbered third stages ST31, ST33, . . . . The second clock signal NCLK2 and the fourth clock signal NCLK4 may be alternately input to the clock terminals of the even-numbered second stages ST22, ST24, . . . .

The first second stage ST21 arranged on the left side and the second second stage ST22 arranged on the right side may share a second start signal line SL2, and may receive a second start signal GI_FLM. The first third stage ST31 arranged on the right side and the second third stage ST32 arranged on the left side may share a third start signal line SL3, and may receive a third start signal GC_FLM.

The second stages ST21, ST22, ST23, ST24, . . . , may generate high-level second gate signals GI in such a way that a second stage on the left side and a second stage on the right side alternately generate high-level second gate signals in correspondence with the order of the first clock signal NCLK1, the second clock signal NCLK2, the third clock signal NCLK3, and the fourth clock signal NCLK4 according to the second start signal GI_FLM, and may sequentially output the generated high-level second gate signals GI to the second gate lines GIL.

The third stages ST31, ST32, ST33, ST34, . . . , may generate high-level third gate signals GC in such a way that a third stage on the right side and a third stage on the left side alternately generate high-level third gate signals in correspondence with the order of the fourth clock signal NCLK4, the first clock signal NCLK1, the second clock signal NCLK2, and the third clock signal NCLK3 according to the third start signal GC_FLM, and may sequentially output the generated high-level third gate signals GC to the third gate lines GCL.

The third driver circuit 135Lb on the left side may include odd-numbered fourth stages ST41, ST43, . . . , and even-numbered fifth stages ST52, ST54, . . . , that alternate with each other. The first clock signal PCLK1 and the third clock signal PCLK3 may be alternately input to the clock terminals of the odd-numbered fourth stages ST41, ST43, . . . . The first clock signal PCLK1 and the third clock signal PCLK3 may be alternately input to the clock terminals of the even-numbered fifth stages ST52, ST54, . . . .

The third driver circuit 135Rb on the right side may include odd-numbered fifth stages ST51, ST53, . . . , and even-numbered fourth stages ST42, ST44, . . . , that alternate with each other. The second clock signal PCLK2 and the fourth clock signal PCLK4 may be alternately input to the clock terminals of the odd-numbered fifth stages ST51, ST53, . . . . The second clock signal PCLK2 and the fourth clock signal PCLK4 may be alternately input to the clock terminals of the even-numbered fourth stages ST42, ST44, . . . .

The first fourth stage ST41 arranged on the left side and the second fourth stage ST42 arranged on the right side may share a fourth start signal line SL4, and may receive a fourth start signal EM_FLM. The first fifth stage ST51 arranged on the right side and the second fifth stage ST52 arranged on the left side may share a fifth start signal line SL5, and may receive a fifth start signal GB_FLM.

The fourth stages ST41, ST42, ST43, ST44, . . . , may generate high-level fourth gate signals EM[1], EM[2], EM[3], EM[4], . . . , in such a way that a fourth stage on the left side and a fourth stage on the right side alternately generate high-level fourth gate signals in correspondence with the order of the first clock signal PCLK1, the second clock signal PCLK2, the third clock signal PCLK3, and the fourth clock signal PCLK4 according to the fourth start signal EM_FLM, and may sequentially output the generated high-level fourth gate signals EM[1], EM[2], EM[3], EM[4], . . . to the fourth gate lines EML.

The fifth stages ST51, ST52, ST53, ST54, . . . , may generate high-level fifth gate signals GB in such a way that a fifth stage on the right side and a fifth stage on the left side alternately generate high-level fifth gate signals in correspondence with the order of the fourth clock signal PCLK4, the first clock signal PCLK1, the second clock signal PCLK2, and the third clock signal PCLK3 according to the fifth start signal GB_FLM, and may sequentially output the generated high-level fifth gate signals GB to the fifth gate lines GBL.

A gate driver circuit according to embodiments may be implemented as an interlaced driver circuit in which stages of sub-driver circuits of which output signals have the same voltage levels and output timings of the same voltage level overlap each other (are identical or similar to each other) are alternately arranged on the left and right sides, and stages (a first stage and a second stage) of the same sub-driver circuits arranged at a first position on the left and right sides may share a start signal line and a start signal. The start timing and width of an output signal of each of the first stage and the second stage may be determined by the start timing and width of a start signal and the period of a clock signal.

A display apparatus including an interlaced driver circuit according to embodiments may have a reduced peripheral area in comparison with a comparative example of connecting a start line to which a start signal is independently input to a left driver circuit and a right driver circuit, thereby providing an expanded display area and an increased resolution.

The number of stages constituting a gate driver circuit to which an interlaced driver circuit according to an embodiment has been applied may vary according to the number of rows (horizontal lines) provided on a display panel.

A display apparatus according to an embodiment may be, for example, an organic light-emitting display apparatus, an inorganic light-emitting display apparatus, or a quantum dot light-emitting display apparatus. A display apparatus according to an embodiment displays a video or a still image, and thus may visually provide information to a user. The display apparatus may be used as display screens of not only portable electronic apparatus, such as mobile phones, smartphones, tablet personal computers (PCs), mobile communication terminals, electronic notebooks, electronic books, portable multimedia players (PMPs), navigation devices, and ultra mobile PCs (UMPCs) but also display screens of various products, such as televisions, notebooks, monitors, advertisement panels, and Internet of things (IoT) devices.

According to an embodiment, the electronic apparatus may output various information through a display apparatus in an operating system. In case that a processor executes an application stored in memory, the display apparatus may provide application information to the user through a display panel.

An electronic apparatus according to the disclosure may be any of various types of devices. The electronic apparatus according to the disclosure may include, for example, at least one of a portable communication device (for example, a smartphone), a computer device, a portable multimedia device, a portable medical device, a camera, a wearable device, or a home appliance. The electronic apparatus according to the disclosure is not limited thereto.

Figure 22:
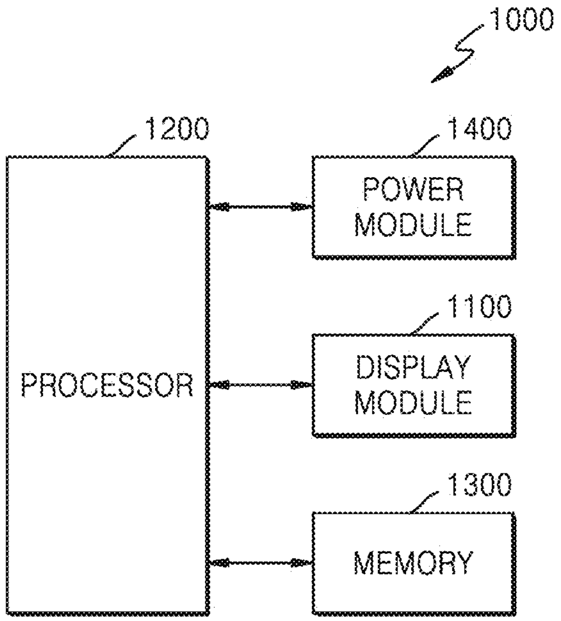
FIG. 22 is a block diagram of an electronic apparatus according to an embodiment.

FIG. 22 is a block diagram of an electronic apparatus 1000 according to an embodiment.

Referring to FIG. 22, the electronic apparatus 1000 according to an embodiment may include a display module 1100, a processor 1200, a memory 1300, and a power module 1400.

The electronic apparatus 1000 may output various pieces of information through the display module 1100 within an operating system.

The processor 1200 may include at least one of a central processing unit (CPU), an application processor (AP), a graphics processing unit (GPU), a communication processor (CP), an image signal processor (ISP), and a controller. According to an embodiment, the processor 1200 may be provided by being divided into two or more from a functional or structural perspective. For example, the processor 1200 may include a main processor in the form of a first drive chip including a CPU, and an auxiliary processor in the form of a second drive chip including a controller that receives an image signal from the main processor and processes the image signal to conform to the interface specifications of the display module 1100.

The memory 1300 may include at least one of a non-volatile memory and a volatile memory. The memory 1300 may store data information necessary for an operation of the processor 1200 or the display module 1100. When the processor 1200 executes an application stored in the memory 1300, an image data signal and/or an input control signal may be transmitted to the display module 1100, and the display module 1100 may process the received signal and output image information through a display screen.

The power module 1400 may include a power supply module, such as a power adapter or a battery device, and a power conversion module that converts power supplied by the power supply module to generate power necessary for an operation of the electronic apparatus 1000. Power conversion by the power conversion module may include, but is not limited to, DC-to-DC conversion, AC-to-DC conversion, and DC-to-AC conversion.

At least one of the components of the electronic apparatus 1000 described above may be included in the display apparatuses according to the above-described embodiments. In addition, some of the individual modules functionally included within a module may be included within a display apparatus, and the others may be provided separately from the display apparatus. For example, the display apparatus may include the auxiliary processor included in the processor 1200, and the display module 1100, and the main processor included in the processor 1200, the memory 1300, and the power module 1400 may be provided in the form of other devices within the electronic apparatus 1000 rather than the display apparatus. As another example, the power module 1400 may be provided within the display apparatus, and may supply power to the processor 1200 and the memory 1300 provided within the electronic apparatus 1000 other than the display apparatus. However, embodiments are not limited to the above examples.

Figure 23:
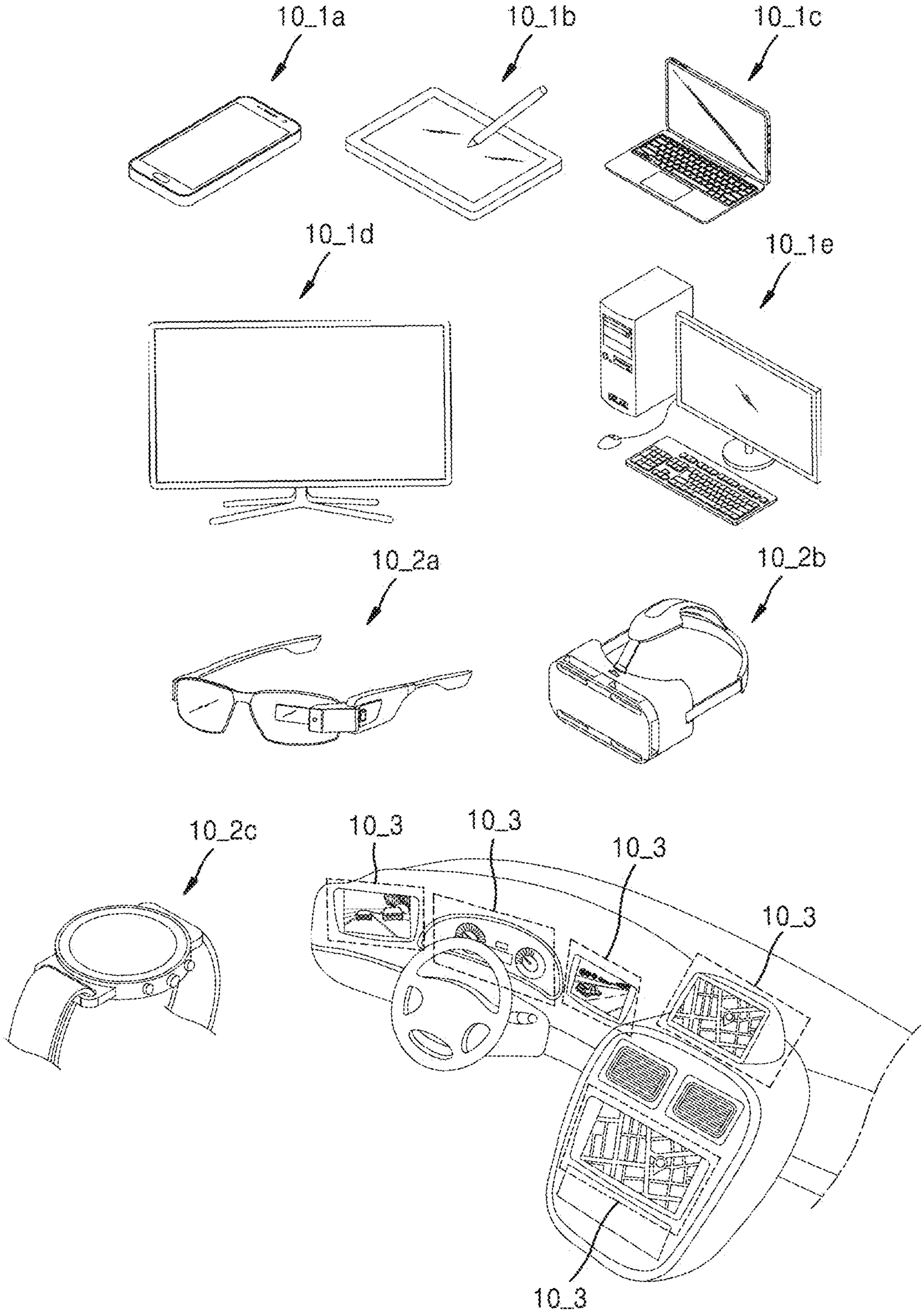
FIG. 23 is a schematic diagram of electronic apparatuses according to various embodiments.

FIG. 23 is a schematic diagram of electronic apparatuses according to various embodiments.

Display apparatuses according to embodiments display a video or a still image, and are thus applicable to various electronic apparatuses. Referring to FIG. 23, various electronic apparatuses to which display apparatuses according to embodiments are applied may include not only image display electronic apparatuses (such as, a smartphone 10_1*a*, a tablet PC 10_1*b*, a laptop 10_1*c*, a TV 10_1*d*, and a desk monitor 10_1*c*), but also wearable electronic apparatuses including display modules (such as, smart glasses 10_2*a*, a head mounted display 10_2*b*, and a smart watch 10_2*c*), and vehicle electronic apparatuses 10_3 including display modules (such as, a center information display (CID) arranged on an instrument panel, center fascia, or dashboard of automobiles, and a room mirror display). The electric apparatus 1000 according to embodiments are not limited to the above-described apparatuses.

The electronic apparatus of FIG. 23 may include the components illustrated in FIG. 22. For example, the smartphone 10_1*a* may include the display module 1100, the processor 1200, the memory 1300, and the power module 1400 illustrated in FIG. 22. The smartphone 10_1*a* may further include a communication module and a battery device. Power provided by the battery device may be converted through the power module 1400 and provided to the processor 1200, the memory 1300, and the display module 1100. According to an embodiment, a display apparatus applied to the smartphone 10_1*a* may include the display module 1100, and may further include the power module 1400. The processor 1200 and the memory 1300 may be provided in the form of chips mounted on a motherboard, which is an external device, but are not limited thereto.

According to an embodiment, provided are a driver circuit capable of stably outputting a gate signal while having a non-display area with a reduced size, a display apparatus including the driver circuit, and an electronic apparatus including the driver circuit. Effects of the disclosure are not limited to the above effects but may variously extend without departing from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope and as defined by the following claims.

What is claimed is:

1. A display apparatus comprising:

a plurality of pixels arranged in a display area;

a first driving circuit arranged in a peripheral area outside of the display area; and a second driving circuit facing the first driving circuit and arranged in the peripheral area, wherein the first driving circuit includes odd-numbered first stages among a plurality of first stages that output a first gate signal to the plurality of pixels, and even-numbered second stages among a plurality of second stages that output a second gate signal to the plurality of pixels, the second driving circuit includes odd-numbered second stages among the plurality of second stages and even-numbered first stages among the plurality of first stages, the odd-numbered first stages and the even-numbered second stages are arranged alternately, and the odd-numbered second stages and the even-numbered first stages are arranged alternately.

2. The display apparatus of claim 1, further comprising:

a first start signal line electrically connected to an input terminal of a first stage arranged at a first position among the odd-numbered first stages and to an input terminal of a first stage arranged at a first position among the even-numbered first stages; and a second start signal line electrically connected to an input terminal of a second stage arranged at a first position among the odd-numbered second stages and to an input terminal of a second stage arranged at a first position among the even-numbered second stages.

3. The display apparatus of claim 2, further comprising:

a clock line electrically connected to the first driving circuit and the second driving circuit, wherein the clock line includes a first clock line into which a first clock signal is input, a second clock line into which a second clock signal is input, a third clock line into which a third clock signal is input, and a fourth clock line into which a fourth clock signal is input, and the first clock signal, the second clock signal, the third clock signal, and the fourth clock signal are signals of a same waveform that are phase shifted.

4. The display apparatus of claim 3, further comprising a controller that independently controls an output timing of a first start signal input to the first start signal line and an output timing of a second start signal input to the second start signal line.

5. The display apparatus of claim 4, wherein the controller controls a timing at which and a width with which the first gate signal is output with a first voltage level, based on a combination of outputs of the first start signal and the first clock signal, the second clock signal, the third clock signal and the fourth clock signal.

6. The display apparatus of claim 4, wherein the controller controls a timing at which and a width with which the second gate signal is output with a first voltage level, based on a combination of outputs of the second start signal and the first clock signal, the second clock signal, the third clock signal and the fourth clock signal.

7. The display apparatus of claim 3, wherein the first clock line and the third clock line are alternately electrically connected to the odd-numbered first stages of the first driving circuit, and the second clock line and the fourth clock line are alternately electrically connected to the even-numbered first stages of the second driving circuit.

8. The display apparatus of claim 3, wherein the fourth clock line and the second clock line are alternately electrically connected to the odd-numbered second stages of the second driving circuit, and the first clock line and the third clock line are alternately electrically connected to the even-numbered second stages of the first driving circuit.

9. The display apparatus of claim 3, wherein the odd-numbered first stages and the even-numbered first stages alternately sequentially output the first gate signal, and the odd-numbered second stages and the even-numbered second stages alternately sequentially output the second gate signal.

10. The display apparatus of claim 2, wherein a first gate signal output by a previous odd-numbered first stage is input to an input terminal of each of first stages arranged at second and subsequent positions among the odd-numbered first stages, and a first gate signal output by a previous even-numbered first stage is input to an input terminal of each of first stages arranged at second and subsequent positions among the even-numbered first stages.

11. The display apparatus of claim 2, wherein a second gate signal output by a previous odd-numbered second stage is input to an input terminal of each of second stages arranged at second and subsequent positions among the odd-numbered second stages, and a second gate signal output by a previous even-numbered second stage is input to an input terminal of each of second stages arranged at second and subsequent positions among the even-numbered second stages.

12. An electronic apparatus comprising:

a controller that outputs a plurality of start signals and a plurality of clock signals;

a power supply circuit that outputs a voltage; and a driving circuit that outputs a gate signal, based on the plurality of start signals, the plurality of clock signals, and the voltage, wherein the driving circuit includes a first driving circuit and a second driving circuit facing the first driving circuit, the first driving circuit includes odd-numbered first stages among a plurality of first stages that output a first gate signal to a plurality of pixels; and even-numbered second stages among a plurality of second stages that output a second gate signal to the plurality of pixels, the second driving circuit includes odd-numbered second stages among the plurality of second stages; and even-numbered first stages among the plurality of first stages, the odd-numbered first stages and the even-numbered second stages are arranged alternately, and the odd-numbered second stages and the even-numbered first stages are arranged alternately.

13. The electronic apparatus of claim 12, wherein a first start signal line via which a first start signal is input is electrically connected to an input terminal of a first stage arranged at a first position among the odd-numbered first stages and to an input terminal of a first stage arranged at a first position among the even-numbered first stages, and a second start signal line via which a second start signal is input is electrically connected to an input terminal of a second stage arranged at a first position among the odd-numbered second stages and to an input terminal of a second stage arranged at a first position among the even-numbered second stages.

14. The electronic apparatus of claim 13, wherein the plurality of clock signals include a first clock signal, a second clock signal, a third clock signal, and a fourth clock signal, and the first clock signal, the second clock signal, the third clock signal, and the fourth clock signal are signals of a same waveform that are phase shifted.

15. The electronic apparatus of claim 14, wherein the first clock signal and the third clock signal are alternately input to the odd-numbered first stages of the first driving circuit, and the second clock signal and the fourth clock signal are alternately input to the even-numbered first stages of the second driving circuit.

16. The electronic apparatus of claim 14, wherein the fourth clock signal and the second clock signal are alternately input to the odd-numbered second stages of the second driving circuit, and the first clock signal and the third clock signal are alternately input to the even-numbered second stages of the first driving circuit.

17. The electronic apparatus of claim 14, wherein the odd-numbered first stages and the even-numbered first stages alternately sequentially output the first gate signal, and the odd-numbered second stages and the even-numbered second stages alternately sequentially output the second gate signal.

18. The electronic apparatus of claim 14, wherein the controller independently controls an output timing of the first start signal and an output timing of the second start signal;

controls a timing at which and a width with which the first gate signal is output with a first voltage level, based on a combination of outputs of the first start signal and the first clock signal, the second clock signal, the third clock signal and the fourth clock signal; and controls a timing at which and a width with which the first gate signal is output with a first voltage level, based on a combination of outputs of the second start signal and the first clock signal, the second clock signal, the third clock signal and the fourth clock signal.

19. The electronic apparatus of claim 13, wherein a first gate signal output by a previous odd-numbered first stage is input to an input terminal of each of first stages arranged at second and subsequent positions among the odd-numbered first stages, and a first gate signal output by a previous even-numbered first stage is input to an input terminal of each of first stages arranged at second and subsequent positions among the even-numbered first stages.

20. The electronic apparatus of claim 13, wherein a second gate signal output by a previous odd-numbered second stage is input to an input terminal of each of second stages arranged at second and subsequent positions among the odd-numbered second stages, and a second gate signal output by a previous even-numbered second stage is input to an input terminal of each of second stages arranged at second and subsequent positions among the even-numbered second stages.

* * * * *